US 9,580,098 B2

(12) United States Patent
Eisinger

(10) Patent No.: US 9,580,098 B2
(45) Date of Patent: Feb. 28, 2017

(54) FOLDABLE STROLLERS

(71) Applicant: Kolcraft Enterprises, Inc., Chicago, IL (US)

(72) Inventor: Darren Eisinger, Chicago, IL (US)

(73) Assignee: Kolcraft Enterprises, Inc., Chicago, IL (US)

( * ) Notice: Subject to any disclaimer, the term of this patent is extended or adjusted under 35 U.S.C. 154(b) by 0 days.

(21) Appl. No.: 14/861,538

(22) Filed: Sep. 22, 2015

(65) Prior Publication Data

US 2016/0009308 A1 Jan. 14, 2016

Related U.S. Application Data

(63) Continuation of application No. 13/835,879, filed on Mar. 15, 2013, now Pat. No. 9,216,755.
(Continued)

(51) Int. Cl.
*B62B 7/06* (2006.01)
*B62B 3/02* (2006.01)
(Continued)

(52) U.S. Cl.
CPC ............... *B62B 7/062* (2013.01); *B62B 3/02* (2013.01); *B62B 5/065* (2013.01); *B62B 7/06* (2013.01);
(Continued)

(58) Field of Classification Search
None
See application file for complete search history.

(56) References Cited

U.S. PATENT DOCUMENTS 2,478,512 A * 8/1949 Taylor ...................... B62B 7/06
16/436
2,689,135 A * 9/1954 Toohey .................. B62B 7/083
280/644
(Continued)

FOREIGN PATENT DOCUMENTS

DE 3130163 2/1983
DE 10011588 1/2001
(Continued)

OTHER PUBLICATIONS

United States Patent and Trademark Office, "Non-Final Office Action," issued in connection with U.S. Appl. No. 13/835,879 on Jan. 29, 2015, 58 pages.
(Continued)

*Primary Examiner* — John Walters
*Assistant Examiner* — Hilary L Johns
(74) *Attorney, Agent, or Firm* — Hanley, Flight & Zimmerman, LLC

(57) ABSTRACT

An example stroller disclosed herein includes a joint carried by a frame. The joint includes a first housing, a second housing, and a third housing disposed between the first housing and the second housing. The first, second, and third housings respectively include first, second, and third openings. The stroller includes a lock including a lever and a bar. The bar is to simultaneously mater with the first, second, and third openings of the first, second, and third housings when the lever is in a first position to prevent rotation of the first housing and the second housing relative to the third housing, and to disengage from the first, second, and third openings of the first, second, and third housings when the lever is in a second position to enable the first housing and the second housing to rotate relative to the third housing to fold the stroller.

27 Claims, 21 Drawing Sheets

Related U.S. Application Data

(60) Provisional application No. 61/618,430, filed on Mar. 30, 2012, provisional application No. 61/678,875, filed on Aug. 2, 2012.

(51) Int. Cl.
*B62B 7/08* (2006.01)
*B62B 5/06* (2006.01)
*B62B 7/04* (2006.01)

(52) U.S. Cl.
CPC ............... *B62B 7/068* (2013.01); *B62B 7/08* (2013.01); *B62B 7/044* (2013.01); *B62B 7/064* (2013.01); *B62B 2205/20* (2013.01); *Y10T 29/49622* (2015.01)

(56) References Cited

U.S. PATENT DOCUMENTS

| | | | | |
|---|---|---|---|---|
| 2,751,232 A * | 6/1956 | Sundberg | B62B 7/08 | 280/644 |
| 2,812,949 A * | 11/1957 | Munro | B62B 7/06 | 280/643 |
| 3,084,949 A * | 4/1963 | Forster | B62B 7/068 | 280/47.371 |
| 3,184,249 A * | 5/1965 | Shone | B62B 7/10 | 280/650 |
| 3,421,774 A * | 1/1969 | Patterson | B62B 7/08 | 280/642 |
| 3,459,435 A * | 8/1969 | Garner | B62B 7/08 | 280/644 |
| 3,873,116 A * | 3/1975 | Perego | B62B 7/08 | 280/47.38 |
| 3,901,528 A * | 8/1975 | Miyagi | B62B 7/08 | 280/644 |
| 4,065,177 A * | 12/1977 | Hyde | B62B 7/147 | 280/31 |
| 4,191,397 A * | 3/1980 | Kassai | B62B 7/062 | 280/647 |
| 4,216,974 A | 8/1980 | Kassai | | |
| 4,272,100 A * | 6/1981 | Kassai | B62B 7/08 | 280/47.4 |
| 4,371,206 A * | 2/1983 | Johnson, Jr. | A47D 13/102 | 294/140 |
| 4,391,453 A | 7/1983 | Glaser | | |
| 4,529,219 A * | 7/1985 | Shamie | B62B 7/08 | 280/642 |
| 4,545,613 A * | 10/1985 | Martel | B60N 2/2821 | 297/256.13 |
| 4,614,454 A * | 9/1986 | Kassai | B62B 7/08 | 16/324 |
| 4,620,711 A * | 11/1986 | Dick | B60N 2/2848 | 224/153 |
| 4,632,421 A * | 12/1986 | Shamie | B62B 7/08 | 280/47.36 |
| 4,634,177 A * | 1/1987 | Meeker | A47D 13/025 | 248/501 |
| 4,641,844 A * | 2/1987 | Mar | A47D 13/025 | 280/30 |
| 4,678,196 A * | 7/1987 | Van Steenburg | B60N 2/2848 | 280/47.41 |
| 4,685,688 A * | 8/1987 | Edwards | B60N 2/2839 | 280/30 |
| 4,725,071 A * | 2/1988 | Shamie | B62B 7/08 | 280/47.4 |
| 4,736,959 A * | 4/1988 | Van Steenburg | B60N 2/2845 | 280/30 |
| 4,786,064 A * | 11/1988 | Baghdasarian | B62B 7/12 | 280/30 |
| 4,832,354 A * | 5/1989 | LaFreniere | B60N 2/2848 | 280/30 |
| 4,832,361 A | 5/1989 | Nakao et al. | | |
| 4,834,403 A * | 5/1989 | Yanus | B60N 2/2848 | 188/20 |
| 4,896,894 A * | 1/1990 | Singletary | B60N 2/2845 | 280/30 |
| 5,104,134 A * | 4/1992 | Cone | B60N 2/2848 | 280/30 |
| 5,121,940 A * | 6/1992 | March | B62B 7/06 | 280/30 |
| 5,133,567 A * | 7/1992 | Owens | B62B 7/12 | 16/445 |
| 5,197,753 A | 3/1993 | Liu | | |
| 5,201,535 A | 4/1993 | Kato et al. | | |
| 5,244,228 A * | 9/1993 | Chiu | B62B 9/24 | 280/47.4 |
| 5,244,292 A * | 9/1993 | Wise | A47D 1/002 | 297/183.3 |
| 5,257,799 A * | 11/1993 | Cone | B62B 5/04 | 280/47.36 |
| 5,288,098 A * | 2/1994 | Shamie | B62B 7/083 | 280/42 |
| 5,454,584 A * | 10/1995 | Haut | B62B 7/08 | 280/642 |
| 5,460,398 A * | 10/1995 | Huang | B62B 7/06 | 280/642 |
| 5,499,831 A * | 3/1996 | Worth | B62B 7/08 | 280/30 |
| 5,513,864 A | 5/1996 | Huang | | |
| 5,516,142 A | 5/1996 | Hartan | | |
| 5,524,503 A * | 6/1996 | Ishikura | B62B 9/20 | 16/429 |
| 5,535,483 A * | 7/1996 | Jane Cabagnero | B62B 9/20 | 16/429 |
| 5,536,033 A * | 7/1996 | Hinkston | B62B 7/08 | 280/62 |
| 5,544,904 A * | 8/1996 | Maher | B62B 9/26 | 280/47.35 |
| 5,590,896 A | 1/1997 | Eichorn | | |
| 5,601,297 A * | 2/1997 | Stein | B62B 9/08 | 188/20 |
| 5,605,409 A | 2/1997 | Haut et al. | | |
| 5,622,377 A | 4/1997 | Shamie | | |
| 5,645,293 A * | 7/1997 | Cheng | B62B 7/08 | 280/47.36 |
| 5,709,400 A * | 1/1998 | Bonnier | B62B 7/08 | 280/47.38 |
| 5,765,958 A * | 6/1998 | Lan | B62B 7/06 | 403/84 |
| 5,772,235 A * | 6/1998 | Espenshade | B62B 7/123 | 280/643 |
| 5,794,951 A * | 8/1998 | Corley | B62B 7/142 | 280/30 |
| 5,845,924 A * | 12/1998 | Huang | B62B 7/06 | 280/47.36 |
| 5,845,925 A * | 12/1998 | Huang | B62B 7/083 | 280/642 |
| 5,863,061 A * | 1/1999 | Ziegler | B62B 7/08 | 280/42 |
| 5,865,460 A * | 2/1999 | Huang | B62B 7/06 | 280/642 |
| 5,882,030 A | 3/1999 | Haut | | |
| 5,921,574 A | 7/1999 | Driessen et al. | | |
| 5,961,180 A * | 10/1999 | Greger | A47D 13/025 | 297/183.2 |
| 6,086,086 A | 7/2000 | Hanson et al. | | |
| 6,086,087 A | 7/2000 | Yang | | |
| 6,095,548 A * | 8/2000 | Baechler | B62B 7/062 | 280/642 |
| 6,102,431 A * | 8/2000 | Sutherland | B62B 7/062 | 280/47.17 |
| 6,152,477 A * | 11/2000 | Hsin | B62B 7/08 | 280/642 |
| 6,155,579 A | 12/2000 | Eyman et al. | | |
| 6,155,592 A | 12/2000 | Hsia | | |
| 6,155,740 A * | 12/2000 | Hartenstine | B62B 7/08 | 280/38 |
| 6,176,507 B1 | 1/2001 | Bigo et al. | | |

(56) References Cited

U.S. PATENT DOCUMENTS

| | | | |
|---|---|---|---|
| 6,183,001 B1 * | 2/2001 | Ageneau | B62B 7/142 280/47.38 |
| 6,189,914 B1 * | 2/2001 | Worth | B62B 7/08 280/642 |
| 6,196,571 B1 * | 3/2001 | Chen | B62B 7/08 280/647 |
| 6,238,125 B1 * | 5/2001 | Lin | B62B 7/06 403/102 |
| 6,241,274 B1 | 6/2001 | Huang | |
| 6,267,405 B1 * | 7/2001 | Chen | B62B 7/08 280/647 |
| 6,270,111 B1 | 8/2001 | Hanson et al. | |
| 6,302,412 B1 | 10/2001 | Worth et al. | |
| 6,302,613 B1 * | 10/2001 | Lan | B62B 7/06 280/642 |
| 6,322,098 B1 * | 11/2001 | Lan | B62B 7/08 280/42 |
| 6,375,213 B1 | 4/2002 | Suzuki | |
| 6,409,205 B1 * | 6/2002 | Bapst | B62B 7/06 280/642 |
| 6,412,809 B1 | 7/2002 | Bigo et al. | |
| 6,446,990 B1 | 9/2002 | Nania et al. | |
| 6,478,327 B1 | 11/2002 | Hartenstine et al. | |
| 6,478,328 B1 * | 11/2002 | Yeh | B62B 7/08 16/113.1 |
| 6,513,827 B1 | 2/2003 | Barenbrug | |
| 6,550,801 B1 * | 4/2003 | Newhard | B62B 7/06 280/47.371 |
| 6,557,885 B1 * | 5/2003 | Kakuda | B62B 7/06 280/642 |
| 6,572,134 B2 * | 6/2003 | Barrett | B62B 7/145 280/47.4 |
| 6,626,452 B2 * | 9/2003 | Yang | B60N 2/2845 280/643 |
| 6,641,164 B2 * | 11/2003 | Wood | B62B 7/14 280/30 |
| 6,666,473 B2 | 12/2003 | Hartenstine et al. | |
| 6,692,015 B2 | 2/2004 | Perego | |
| 6,715,783 B1 | 4/2004 | Hanson et al. | |
| 6,722,690 B2 * | 4/2004 | Lan | B62B 7/08 280/47.38 |
| 6,736,451 B1 | 5/2004 | Chen | |
| 6,752,413 B2 * | 6/2004 | Yamazaki | B62B 7/06 280/42 |
| 6,802,514 B2 | 10/2004 | Worth et al. | |
| 6,824,161 B2 * | 11/2004 | Iwata | B62B 7/08 280/642 |
| D502,896 S * | 3/2005 | Pullam, St | D12/129 |
| 6,869,096 B2 | 3/2005 | Allen et al. | |
| 6,880,850 B2 * | 4/2005 | Hsia | B62B 9/104 280/47.4 |
| 6,896,286 B2 | 5/2005 | Lin | |
| 6,910,708 B2 * | 6/2005 | Sack | B62B 7/08 280/642 |
| 6,910,709 B2 * | 6/2005 | Chen | B62B 7/06 280/642 |
| 6,923,467 B2 * | 8/2005 | Hsia | B60N 2/2845 280/47.38 |
| 6,991,248 B2 * | 1/2006 | Valdez | B62B 7/08 280/642 |
| 7,011,316 B1 | 3/2006 | Peridon | |
| 7,017,921 B2 * | 3/2006 | Eros | B62B 9/28 280/47.38 |
| 7,021,650 B2 * | 4/2006 | Chen | B62B 7/06 280/642 |
| 7,032,922 B1 | 4/2006 | Lan | |
| 7,044,497 B2 | 5/2006 | Hartenstine et al. | |
| 7,070,197 B2 * | 7/2006 | Chen | B62B 7/123 280/641 |
| 7,077,420 B1 * | 7/2006 | Santoski | B62B 7/062 280/639 |
| 7,090,291 B2 * | 8/2006 | Birchfield | B60N 2/2845 280/30 |
| 7,118,121 B2 | 10/2006 | Cheng et al. | |
| 7,188,858 B2 * | 3/2007 | Hartenstine | B62B 7/083 280/642 |
| 7,210,699 B2 | 5/2007 | Lan | |
| 7,237,795 B2 * | 7/2007 | Wu | B62B 3/12 280/651 |
| 7,273,225 B2 * | 9/2007 | Yeh | B62B 9/20 280/38 |
| 7,278,652 B2 * | 10/2007 | Riedl | B62B 7/08 280/47.38 |
| 7,281,732 B2 | 10/2007 | Fox et al. | |
| 7,296,820 B2 | 11/2007 | Valdez et al. | |
| 7,377,537 B2 * | 5/2008 | Li | B62B 7/123 280/47.38 |
| 7,396,039 B2 | 7/2008 | Valdez et al. | |
| 7,401,803 B1 * | 7/2008 | Lai | B62B 7/08 280/47.38 |
| 7,404,569 B2 | 7/2008 | Hartenstine et al. | |
| 7,410,186 B2 | 8/2008 | Hartenstine et al. | |
| 7,410,187 B2 | 8/2008 | Hartenstine et al. | |
| 7,419,181 B2 | 9/2008 | Kassai et al. | |
| 7,445,228 B2 | 11/2008 | Henry | |
| 7,455,354 B2 * | 11/2008 | Jane Santamaria | A47D 13/02 297/183.3 |
| 7,464,957 B2 | 12/2008 | Worth et al. | |
| 7,497,461 B2 | 3/2009 | Emerson | |
| 7,566,068 B2 | 7/2009 | Santamaria | |
| 7,584,985 B2 | 9/2009 | You et al. | |
| 7,600,775 B2 * | 10/2009 | Chen | B62B 7/14 280/642 |
| 7,614,641 B2 | 11/2009 | Hartenstine et al. | |
| 7,632,035 B2 * | 12/2009 | Cheng | B62B 7/008 280/642 |
| 7,651,115 B1 * | 1/2010 | Hartenstine | B62B 9/20 280/47.131 |
| 7,658,399 B2 | 2/2010 | Van Dijk | |
| 7,686,322 B2 | 3/2010 | Longenecker et al. | |
| 7,694,980 B2 | 4/2010 | Dotsey et al. | |
| 7,694,995 B2 | 4/2010 | Dotsey et al. | |
| 7,694,996 B2 * | 4/2010 | Saville | B62B 7/062 280/47.38 |
| 7,712,765 B2 * | 5/2010 | Chen | B62B 9/20 280/642 |
| 7,726,683 B2 | 6/2010 | Moriguchi et al. | |
| 7,753,398 B2 * | 7/2010 | Yang | B62B 9/102 280/642 |
| 7,766,366 B2 | 8/2010 | Li | |
| 7,766,367 B2 | 8/2010 | Dotsey et al. | |
| 7,798,500 B2 * | 9/2010 | Den Boer | B62B 7/062 280/47.34 |
| 7,798,515 B2 | 9/2010 | Valdez et al. | |
| 7,832,755 B2 * | 11/2010 | Nolan | B62B 7/068 280/47.18 |
| 7,832,756 B2 * | 11/2010 | Storm | B62B 7/062 280/642 |
| 7,871,099 B2 * | 1/2011 | Gilbertson | B62B 7/06 280/43.16 |
| 7,871,100 B2 | 1/2011 | Chen et al. | |
| 7,900,952 B2 | 3/2011 | Cone, II | |
| 7,909,353 B2 | 3/2011 | Nolan et al. | |
| 7,971,897 B2 | 7/2011 | Pike et al. | |
| D643,345 S | 8/2011 | Barenbrug | |
| D643,346 S | 8/2011 | Barenbrug | |
| D643,786 S | 8/2011 | Barenbrug | |
| 8,042,828 B2 | 10/2011 | Ageneau et al. | |
| 8,083,240 B2 * | 12/2011 | Jacobs | B62B 9/18 280/47.38 |
| 8,087,688 B2 | 1/2012 | Gilbertson et al. | |
| 8,087,689 B2 * | 1/2012 | Fritz | B62B 7/062 280/647 |
| 8,092,111 B2 * | 1/2012 | Wu | B62B 7/08 280/642 |
| 8,100,429 B2 | 1/2012 | Longenecker et al. | |
| 8,141,895 B2 | 3/2012 | Haut et al. | |

(56) References Cited

U.S. PATENT DOCUMENTS

| | | | |
|---|---|---|---|
| 8,157,286 B2* | 4/2012 | Lai | B62B 7/08 280/639 |
| 8,186,705 B2 | 5/2012 | Greger et al. | |
| 8,186,706 B2* | 5/2012 | Dotsey | B62B 7/10 280/47.38 |
| 8,205,906 B2* | 6/2012 | Kretschmer | B62B 7/123 280/47.38 |
| 8,205,907 B2* | 6/2012 | Chicca | B62B 7/062 280/642 |
| 8,226,110 B2* | 7/2012 | Liao | B62B 7/062 280/47.38 |
| 8,226,111 B2 | 7/2012 | Valdez et al. | |
| 8,240,700 B2 | 8/2012 | Greger et al. | |
| 8,276,935 B2 | 10/2012 | Minato et al. | |
| 8,282,120 B2* | 10/2012 | Minato | B62B 7/062 280/47.38 |
| 8,308,391 B2 | 11/2012 | Cheng | |
| 8,366,127 B2 | 2/2013 | Zhong et al. | |
| 8,376,375 B2* | 2/2013 | Mival | B62B 7/08 280/47.25 |
| 8,382,127 B2 | 2/2013 | Longenecker et al. | |
| 8,398,111 B2 | 3/2013 | Mival et al. | |
| 8,444,170 B2 | 5/2013 | Chen et al. | |
| 8,448,977 B2 | 5/2013 | Grintz et al. | |
| 8,459,665 B2 | 6/2013 | Sellers et al. | |
| 8,474,836 B2 | 7/2013 | Yang et al. | |
| 8,474,854 B2 | 7/2013 | Dean et al. | |
| 8,485,546 B2 | 7/2013 | Li et al. | |
| 8,505,956 B2 | 8/2013 | Hartenstine et al. | |
| 8,505,958 B2 | 8/2013 | Thomas et al. | |
| 8,517,412 B2 | 8/2013 | Tsai et al. | |
| 8,550,489 B2 | 10/2013 | Valdez et al. | |
| 8,590,919 B2 | 11/2013 | Yi | |
| 8,596,669 B2 | 12/2013 | Liao | |
| 8,651,502 B2 | 2/2014 | Winterhalter et al. | |
| 8,672,341 B2 | 3/2014 | Offord | |
| 8,696,015 B2 | 4/2014 | Karremans et al. | |
| 8,714,581 B2 | 5/2014 | Fritz et al. | |
| 8,777,253 B2 | 7/2014 | Minato et al. | |
| 8,827,283 B2 | 9/2014 | Homan et al. | |
| 8,870,214 B2* | 10/2014 | Kane | B62B 7/062 280/47.38 |
| 8,876,147 B2 | 11/2014 | Chicca | |
| 8,888,124 B2* | 11/2014 | Iftinca | B62B 7/142 280/47.38 |
| 8,899,614 B2 | 12/2014 | Smith | |
| 8,905,428 B2 | 12/2014 | Schroeder et al. | |
| 8,919,806 B2 | 12/2014 | Pollack et al. | |
| 8,919,807 B2 | 12/2014 | Taylor et al. | |
| 8,961,057 B2 | 2/2015 | Schroeder | |
| 8,985,616 B1 | 3/2015 | Chen | |
| 8,991,853 B2 | 3/2015 | Li et al. | |
| 8,991,854 B2 | 3/2015 | Greger et al. | |
| 9,044,104 B2 | 6/2015 | Smith | |
| 9,050,993 B2 | 6/2015 | Pollack | |
| 9,193,373 B2 | 11/2015 | Fjelland et al. | |
| 9,216,755 B2 | 12/2015 | Eisinger | |
| 9,403,549 B2 | 8/2016 | Driessen | |
| 9,415,790 B2 | 8/2016 | Driessen | |
| 2003/0034211 A1 | 2/2003 | Iwata | |
| 2003/0071441 A1 | 4/2003 | Yeh | |
| 2003/0094791 A1 | 5/2003 | Hartenstine et al. | |
| 2004/0090044 A1 | 5/2004 | Hsia | |
| 2004/0090046 A1 | 5/2004 | Hartenstine et al. | |
| 2004/0173997 A1 | 9/2004 | Voll | |
| 2005/0098983 A1 | 5/2005 | Cheng et al. | |
| 2005/0127640 A1 | 6/2005 | Worth et al. | |
| 2005/0167951 A1 | 8/2005 | Zhen | |
| 2006/0131841 A1 | 6/2006 | Huang | |
| 2007/0045975 A1 | 3/2007 | Yang | |
| 2007/0085304 A1 | 4/2007 | Yeh | |
| 2007/0164538 A1 | 7/2007 | Yeh | |
| 2008/0061533 A1 | 3/2008 | Li | |
| 2008/0073879 A1 | 3/2008 | Chen et al. | |
| 2008/0079239 A1 | 4/2008 | Li | |
| 2008/0093825 A1 | 4/2008 | Yang | |
| 2008/0231023 A1 | 9/2008 | Yang | |
| 2008/0315562 A1 | 12/2008 | Song et al. | |
| 2009/0033066 A1 | 2/2009 | Saville et al. | |
| 2009/0194973 A1 | 8/2009 | Wang | |
| 2009/0295128 A1 | 12/2009 | Nagelski et al. | |
| 2009/0315299 A1 | 12/2009 | Barenburg | |
| 2010/0078916 A1 | 4/2010 | Chen | |
| 2010/0127480 A1 | 5/2010 | Ahnert et al. | |
| 2010/0230933 A1 | 9/2010 | Dean et al. | |
| 2010/0244393 A1 | 9/2010 | Thomas et al. | |
| 2010/0308550 A1 | 12/2010 | Li et al. | |
| 2010/0308562 A1 | 12/2010 | Valdez et al. | |
| 2011/0084467 A1 | 4/2011 | Liao | |
| 2011/0142533 A1 | 6/2011 | Liu et al. | |
| 2011/0156454 A1 | 6/2011 | Yi et al. | |
| 2011/0163519 A1 | 7/2011 | Van Gelderen et al. | |
| 2011/0175406 A1 | 7/2011 | Zeng | |
| 2011/0181024 A1 | 7/2011 | Chicca | |
| 2011/0291388 A1 | 12/2011 | Sellers et al. | |
| 2011/0291389 A1 | 12/2011 | Offord | |
| 2012/0112435 A1 | 5/2012 | Kobayashi | |
| 2012/0126512 A1 | 5/2012 | Kane et al. | |
| 2012/0256397 A1 | 10/2012 | Valdez et al. | |
| 2012/0261906 A1 | 10/2012 | Chicca | |
| 2013/0113185 A1 | 5/2013 | Zehfuss | |
| 2013/0168947 A1 | 7/2013 | Offord | |
| 2013/0257019 A1 | 10/2013 | Eisinger | |
| 2014/0044472 A1 | 2/2014 | Lin et al. | |
| 2014/0056638 A1 | 2/2014 | Wu et al. | |
| 2014/0167393 A1 | 6/2014 | Tsai et al. | |
| 2015/0042075 A1 | 2/2015 | Smith et al. | |
| 2015/0076794 A1 | 3/2015 | Driessen | |
| 2015/0108738 A1 | 4/2015 | Pollack et al. | |
| 2015/0217793 A1 | 8/2015 | Fjelland et al. | |
| 2015/0266493 A1 | 9/2015 | Driessen | |

FOREIGN PATENT DOCUMENTS

| | | |
|---|---|---|
| EP | 0567422 | 6/1996 |
| FR | 2648102 | 12/1990 |
| GB | 2179897 | 3/1987 |
| WO | 2008-033014 | 3/2008 |

OTHER PUBLICATIONS

United States Patent and Trademark Office, "Notice of Allowance," issued in connection with U.S. Appl. No. 13/835,879 on Jun. 22, 2015, 22 pages.

* cited by examiner

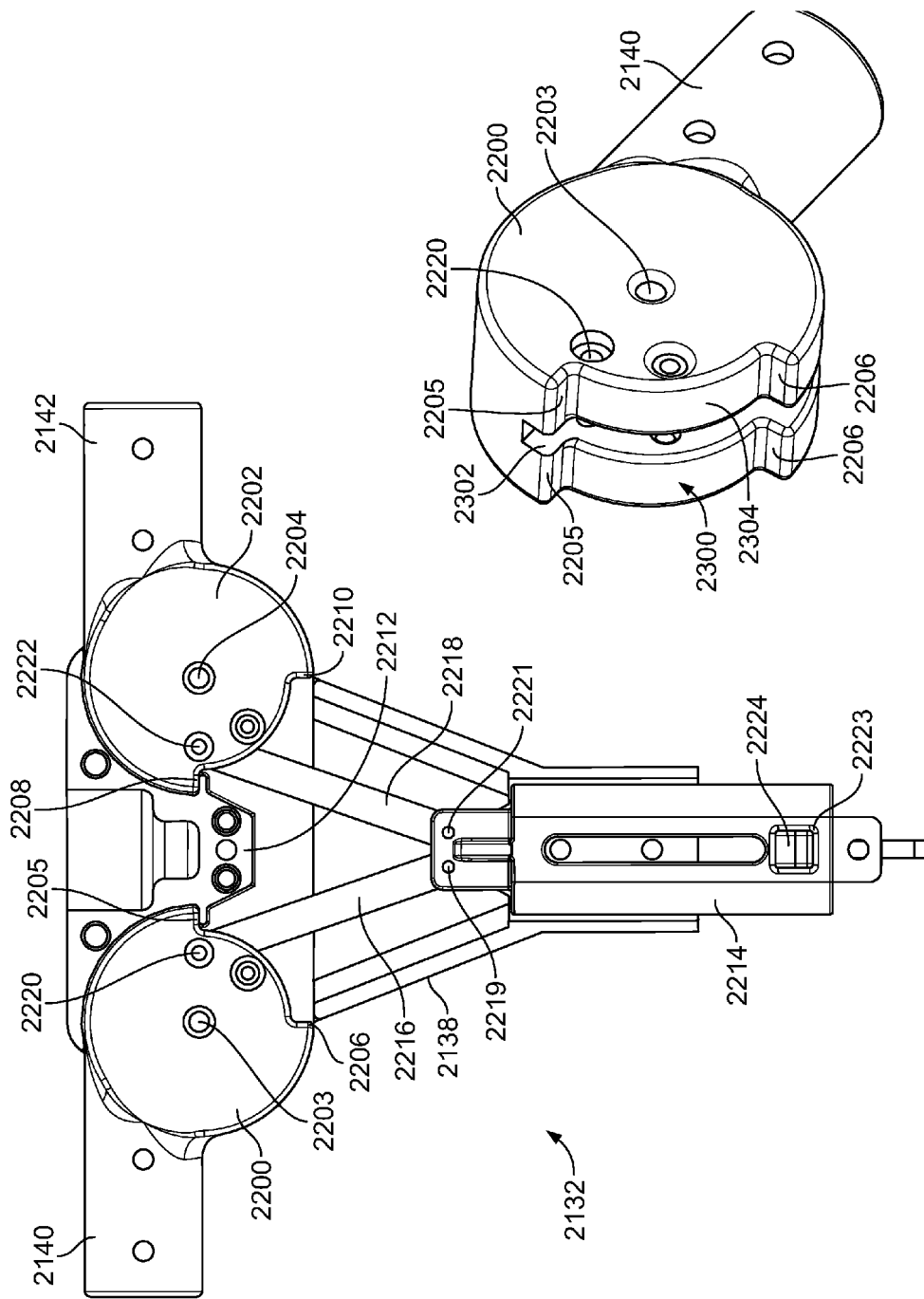

FOLDABLE STROLLERS

RELATED APPLICATIONS

This patent arises from a continuation of U.S. patent application Ser. No. 13/835,879, entitled "Foldable Strollers," which was filed on Mar. 15, 2013, and which claims the benefit of (1) U.S. Provisional Patent Application Ser. No. 61/618,430, entitled "Foldable Strollers," which was filed on Mar. 30, 2012, and (2) U.S. Provisional Patent Application Ser. No. 61/678,875, entitled "Foldable Strollers," which was filed on Aug. 2, 2012. Priority of U.S. patent application Ser. Nos. 13/835,879, 61/618,430, and 61/678,875 is claimed. The disclosures of U.S. patent application Ser. No. 13/835,879, U.S. Provisional Patent Application Ser. No. 61/618,430, and U.S. Provisional Patent Application Ser. No. 61/678,875 are hereby incorporated herein by reference in their entireties.

FIELD OF THE DISCLOSURE

The present disclosure relates generally to strollers and, more particularly, to foldable strollers.

BACKGROUND

Foldable strollers typically include a frame, wheels, and a seat. The frame generally includes at least front legs, rear legs, and a handle, and each side of the frame typically includes a releasable locking mechanism to secure the frame in an unfolded, operable position and to enable the stroller to fold from the unfolded, operable position to a collapsed position.

BRIEF DESCRIPTION OF THE DRAWINGS

FIG. 22 is an enlarged, cutaway view of a left joint of the example stroller of FIG. 21; a right joint of the example stroller being a mirror image thereof.

FIG. 23 is an enlarged view of an example pivot of the example left joint of FIG. 22.

Figure 1:
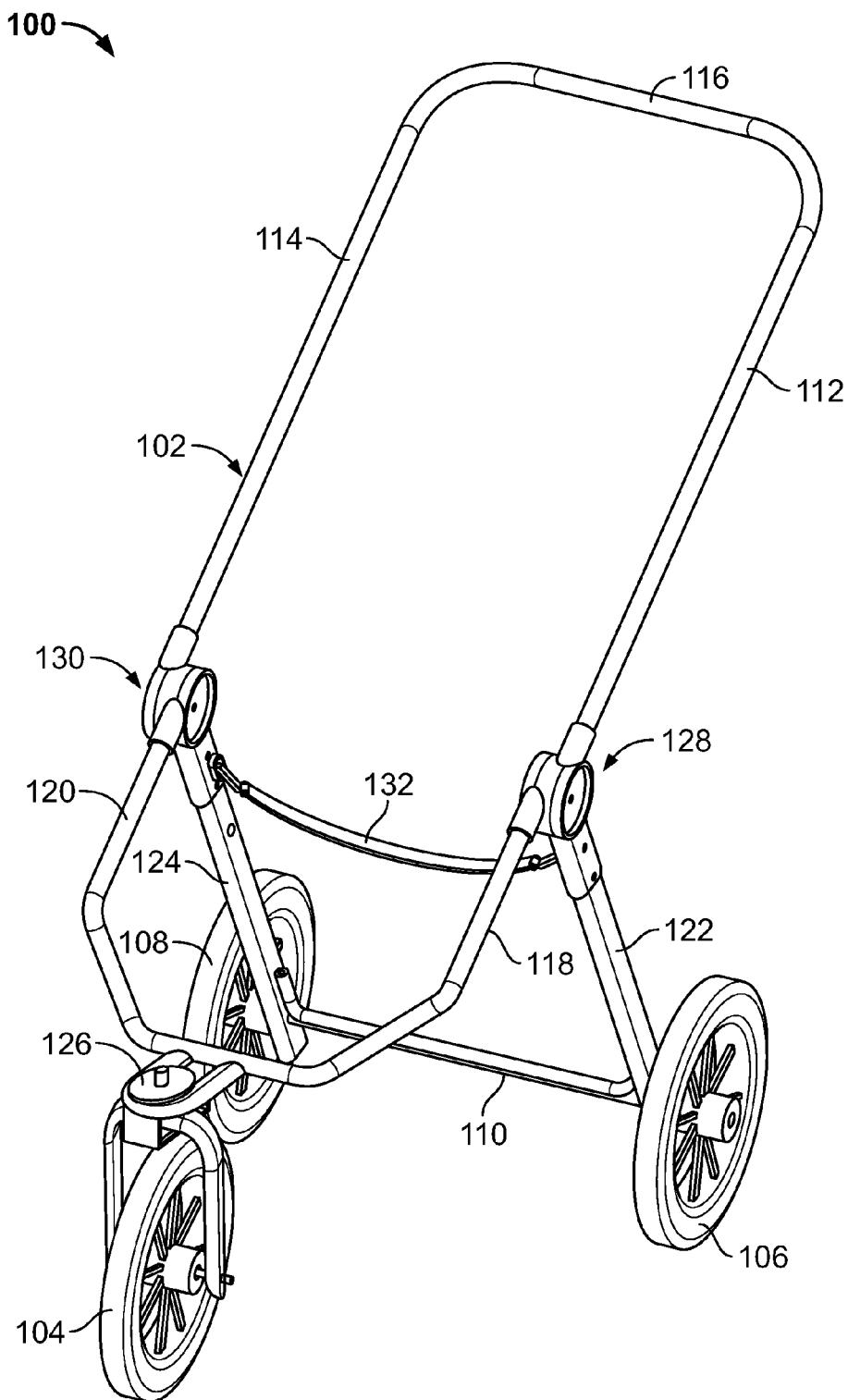
FIG. 1 is a right, front perspective view of an example stroller disclosed herein.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Foldable strollers are disclosed herein. An example stroller includes wheel frame comprising a plurality of frame members (e.g., legs, handles, arms, etc.) and a housing coupled to a first frame member. A first pivot is coupled to a second frame member and rotatably coupled to the housing. The example stroller also includes a second pivot coupled to a third frame member and rotatably coupled to the housing. A follower is slidably coupled to the first frame member, and a first link is rotatably coupled to the first pivot and the follower. A second link is rotatably coupled to the second pivot and the follower to operatively couple the third frame member to the second frame member.

In some examples, the stroller includes a lock to substantially prevent rotation of the third frame member or the second frame member. In some examples, the first link and the second link are curved. In other examples, the first link and the second link are substantially straight.

In some examples, the first pivot defines a first channel and a first end of the first link is disposed in the first channel. In some examples, the first pivot includes a receptacle to receive the second frame member, and a first end of the first link is coupled to the receptacle.

In some examples, the follower is disposed inside at least one of the housing or the first frame member. In some examples, the follower includes a sleeve. In some examples, the first pivot is disposed on a first side of the housing, and the second pivot is disposed on a second side of the housing. In other examples, the first pivot and the second pivot are disposed inside the housing.

The first pivot and the second pivot may rotate about an axis of rotation. In some examples, the first pivot is to rotate about a first axis of rotation and the second pivot is to rotate about a second axis of rotation. In some examples, the follower is pulled toward the first pivot and the second pivot when the stroller moves from an unfolded position to a folded position.

Another example stroller disclosed herein includes a housing. A first pivot and a second pivot are coupled to the housing. The example stroller also includes a follower coupled to the first pivot and the second pivot to move with the first pivot and the second pivot. The example stroller also includes a lock to selectively lock the follower in a locked state to secure the first pivot and the second pivot in a first position.

In some examples, the stroller includes a bar movably coupled to the housing, and the bar is to be received in an aperture of the follower when the follower is in the locked state.

In some examples, the first pivot is to rotate about a first axis of rotation, and the second pivot is to rotate about a second axis of rotation.

In some examples, the stroller also includes a first link and a second link. The first link may be rotatably coupled to the first pivot and the follower, the second link may be rotatably coupled to the second pivot and the follower. In some examples, the first pivot is to rotate about a first axis of rotation, and the first link is to rotate relative to the first pivot about a second axis of rotation.

In some examples, the stroller further includes a stop to define a limit of motion of the first pivot.

Another example stroller disclosed herein includes a follower slidably coupled to a first frame member. The example stroller also includes a first link and a second link. The first link is rotatably coupled to the follower and a second frame member. The second link is rotatably coupled to the follower and a third frame member. The example stroller further includes a lock to engage the follower. The follower in a locked state is to support the second frame member and the third frame member in a first position, and the follower in an unlocked state is to be movable relative to the first frame member to enable the second frame member and the third frame member to rotate from the first position to a second position.

In some examples, the stroller includes a housing, and the follower, the first link and the second link are disposed inside the housing. In some examples, the stroller also includes a first pivot and a second pivot rotatably coupled to the housing. The first link may be rotatably coupled to the second frame member via the first pivot, and the second link may be rotatably coupled to the third frame member via the second pivot.

In some examples, the third frame member and the second frame member are to rotate about different axes of rotation. In some examples, the lock includes a lever coupled to a locking bar.

In some examples, the first link is rotatably coupled to the follower about a first axis of rotation, and the second link is rotatably coupled to the follower about a second axis of rotation.

An example method of folding a stroller having a first frame member and a second frame member in a first position is disclosed herein. The example method includes disengaging a lock from a follower rotatably coupled to the first frame member and the second frame member. The example method also includes moving the follower with the first frame member and the second frame member to fold the stroller to a second position.

In some examples, moving the follower includes rotating the first frame member in a first direction relative to a third frame member. In some examples, moving the follower includes rotating the second frame member in a second direction opposite the first direction relative to the third frame member. In some examples, the follower is moved by rotating the first frame member and the second frame member about different axes of rotation.

In some examples, moving the follower includes rotating a first link rotatably coupled to the first frame member and the follower and rotating a second link rotatably coupled to the second frame member and the follower. In some examples, the follower is moved by sliding the follower along a third frame member.

An example method of manufacturing a stroller is disclosed herein. The example method includes coupling a housing to a first frame member. The example method also includes movably coupling a follower to the first frame member. A second frame member is rotatably coupled to the follower and the housing, and a third frame member is rotatably coupled to the follower and the housing. The example method further includes coupling a lock to the stroller to enable the lock to engage the follower in a locked state.

In some examples, rotatably coupling the second frame member to the follower includes rotatably coupling a first link to the second frame member and the follower. In some examples, rotatably coupling the third frame member to the follower includes rotatably coupling a second link to the third frame member and the follower.

In some examples, rotatably coupling the third frame member to the housing includes rotatably coupling the third frame member to the housing about a first axis of rotation different than a second axis of rotation of the second frame member. In some examples, rotatably coupling the second frame member to the housing includes coupling the second frame member to a first pivot rotatably coupled to the housing.

FIG. 1 depicts an example stroller 100 disclosed herein. The illustrated example includes a frame 102, at least one front wheel 104, and rear wheels 106, 108. Different numbers of front and/or rear wheels are used in other examples. The example stroller 100 also includes an axle 110 coupled to the rear wheels 106, 108. The frame 102 includes a left side and a right side having a plurality of frame members. In the illustrated examples, the frame members on each side include an arm 112, 114 extending from a handle 116, a front leg 118, 120, and a rear leg 122, 124. In some examples, the arms 112, 114 and the handle 116 are integrally formed from a unit such as, for example, a tube. In the illustrated example, when the stroller 100 is in the orientation of FIG. 1, each of the rear legs 122, 124 extends upwardly from the rear axle 110 and toward the front wheel 104. In some examples, the front legs 118, 120 are integrally formed from a unit such as, for example, a tube. In the illustrated example, the front legs 118, 120 are coupled to a mount 126 coupled to the front wheel 104. The example front legs 118, 120 extend from the mount 126 upwardly in the orientation of FIG. 1 and toward the rear wheels 106, 108. In some examples, the front legs 118, 120 are aligned with the arms 112, 114 when the example stroller 100 is in an unfolded, operative position as shown in FIG. 1. For example, the central longitudinal axis of a front leg 118 is aligned with the central longitudinal axis of the arm 112 in some implementations when the stroller 100 is unfolded in the operative position. Thus, the front leg 118 may be aligned with and/or parallel to the arm 112 and the front leg 120 may be aligned with and/or parallel to the arm 114. In some examples, the front legs 118, 120 and/or the arms 112, 114 are substantially perpendicular to the rear legs 122, 124 when the example stroller 100 is in the unfolded, operative position.

Each side of the frame 102 also includes a joint 128, 130. The example left joint 130 is a mirror image of the example right joint 128. A cable or strap 132 is coupled to the joints 128, 130. As described in greater detail below, when a user pulls the cable 132 with sufficient force, the joints 128, 130 unlock such that the arms 112, 114 and front legs 118, 120 are free to rotate relative to the rear legs 122, 124.

Figure 2:
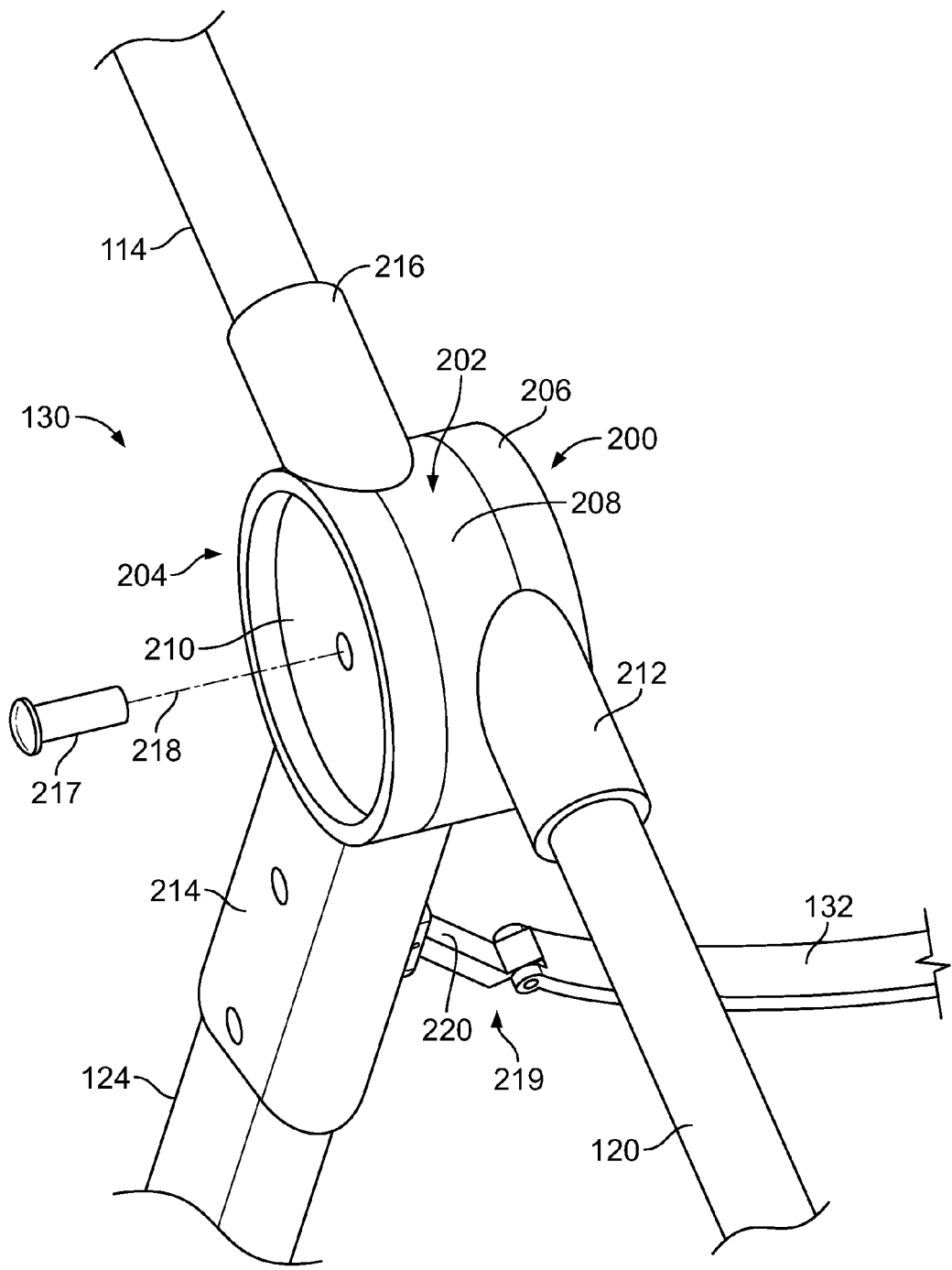
FIG. 2 is an enlarged view of the left joint of the example stroller of FIG. 1; the right joint being a mirror image thereof.

FIG. 2 is an enlarged view of the left joint 130 of the example stroller 100 of FIG. 1. Because the example left joint 130 is a mirror image of the example right joint 128, a separate description of the right joint 128 is not provided here. Instead, the following description of the left joint 130 can be equally applied to the right joint 128.

The example left joint 130 includes an inner housing 200, a middle housing 202, and an outer housing 204. Each of the housings 200, 202, 204 includes a pivot portion 206, 208, 210 and a receptacle portion 212, 214, 216. The pivot portions 206, 210 of the inner and outer housings 200, 204 are rotatably coupled to the pivot portion 208 of the middle housing 202. In the illustrated example, a fastener 217 (e.g., a POP® rivet, bolt, and/or any other suitable fastener) extends through the inner, middle, and outer housings 200, 202, 204 and defines an axis of rotation 218 of the pivot portions 206, 208, 210. The example fastener 217 rotatably couples the inner and outer housings 200, 204 to the middle housing 202. In the illustrated example, the receptacle 206 of the inner housing 200 receives an upper end of the front leg 120. The receptacle 208 of the middle housing 202 receives an upper end of the rear leg 124. The example receptacle 216 of the outer housing 204 receives a lower end of the arm 114. Thus, the example left joint 130 enables the front leg 120 and the arm 114 to rotate relative to the rear leg 124 about the axis of rotation 218. In other examples, the inner, middle and outer housings 200, 202, 204 are fixed to other frame members. For example, in some implementations, the middle housing 202 is fixed to the arm 114 or the front leg 120.

The example joint 130 of FIG. 2 includes a locking mechanism 219. The example locking mechanism 219 includes a locking lever 220. The locking lever 220 of the illustrated example is coupled to the cable 132 and pivotably coupled to the receptacle 214. As described in greater detail below, the inner housing 200 and the outer housing 204 are rotatable relative to the middle housing 202 when a user pulls the cable 132 with sufficient force to move the locking lever from a first position to a second position to unlock the example left joint 130. In this manner, the example joint 130 enables the user to fold the example stroller 100.

Figure 3:
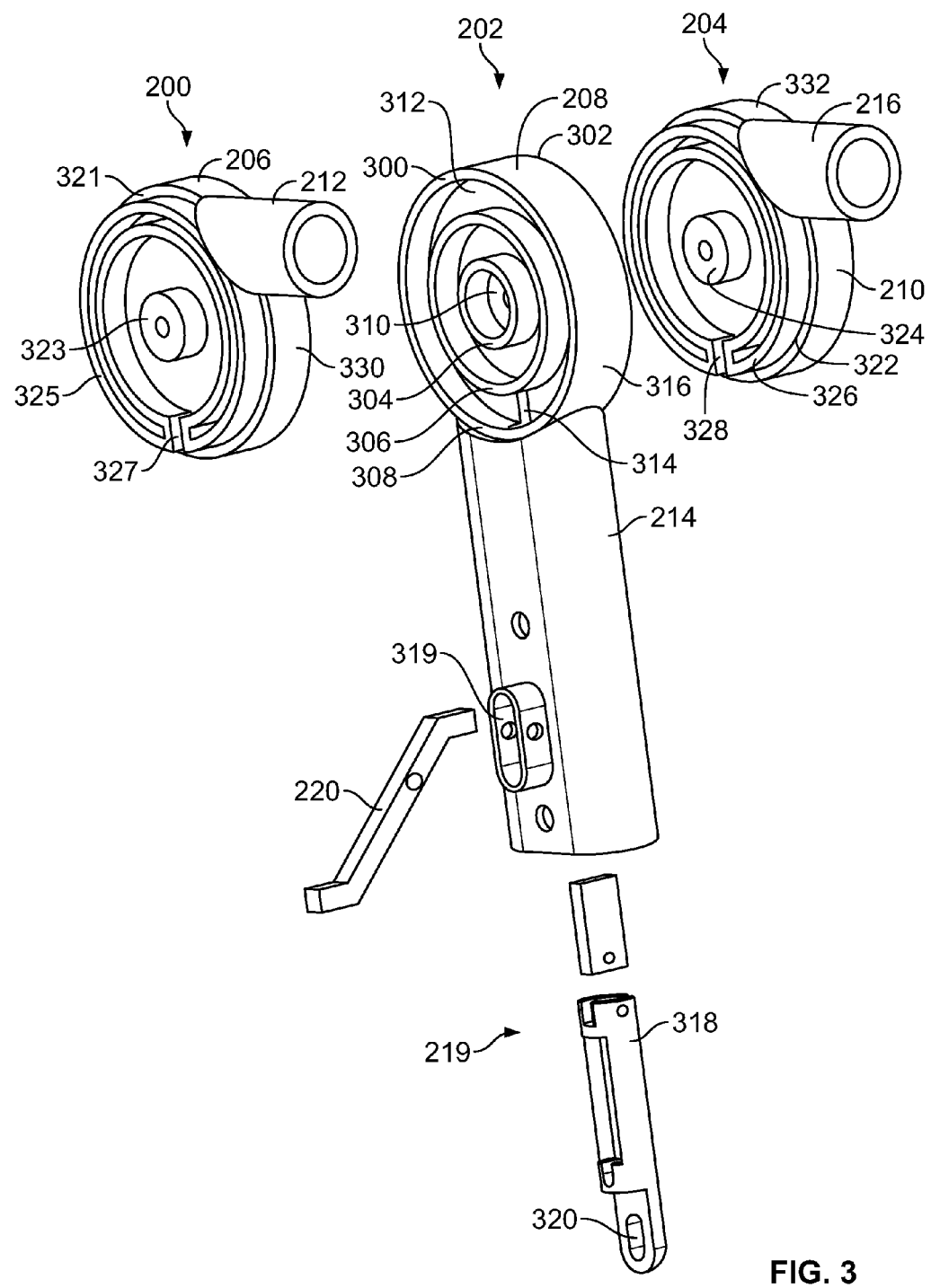
FIG. 3 is an exploded view of the example joint of FIG. 2.

FIG. 3 is an exploded view of the example left joint 130 of FIG. 2. To facilitate the following discussion of the left joint 130, the inner housing 200 of FIG. 3 is shown rotated approximately 180 degrees from its operational position. In the illustrated example, the pivot portion 208 of the middle housing 202 is disk-shaped and includes opposing sides 300, 302 facing the inner housing 200 and the outer housing 204, respectively. However, the pivot portion 208 has other shapes in other examples. In the illustrated example, the sides 300, 302 are substantially identical. Each of the example sides 300, 302 includes three annular, substantially concentric ridges 304, 306, 308. The example first ridge 304 defines a first female connector 310. The example second ridge 306 and the example third ridge 308 define a second female connector 312. The example pivot portion 202 includes a notch 314 extending radially from an outer, circumferential surface 316 of the pivot portion 208 to the second ridge 306 and through the opposing sides 300, 302. In the illustrated example, the receptacle 214 extends radially from the outer, circumferential surface 316 of the pivot portion 208 adjacent the notch 314 (e.g., surrounding the notch 214).

The example locking mechanism 219 includes a plunger 318 to engage the pivot portions 204, 206, 208 to lock the inner and outer housings 200, 204 against movement (e.g., rotation) relative to the middle housing 202. The example plunger 318 is disposed inside the receptacle 214 and slidably coupled to the receptacle 214. The example lever 220 is pivotably coupled to the receptacle 214. In the illustrated example, the lever 220 extends through an aperture 319 of the receptacle 214, and a first end of the lever 220 is seated in an aperture 320 of the plunger 318. A second end of the example lever 220 is operatively coupled to the cable 132. When the lever 220 pivots, the lever 220 moves the plunger 318 toward or away from the notch 314 of pivot portion 208 of the middle housing 202. As disclosed in greater detail below, when the plunger 318 is disposed in the notch 314, the joint 130 locks the example stroller 100 in an unfolded, operable state.

The example pivot portions 206, 210 of the inner and outer housings 200, 204 are also disk-shaped. However, other shapes may be used in other examples. The example pivot portions 206, 210 of the inner and outer housings 200, 204 each include a side 321, 322 to engage one of the sides 300, 302 of the pivot portion 208 of the middle housing 202. Each of the example sides 321, 322 of the pivot portions 206, 210 of the inner and outer housings 200, 204 includes a first male connector 323, 324 and a second male connector 325, 326. The example first male connectors 323, 324 are cylindrically-shaped and disposed on about a center of respective ones of the sides 300, 322. In the illustrated example, the second male connectors 325, 326 are annular ridges, which are substantially concentric to the first male connectors 323, 324. However, other examples employ male connectors having other shapes. The example second male connectors 325, 326 include a notch 327, 328. In the illustrated example, the receptacles 212, 216 of the inner and outer housings 200, 204 extend from an outer, circumferential surface 330, 332 of the respective pivot portions 206, 210 along a chord of the pivot portions 206, 210 (e.g., perpendicular to the axis of rotation 218 of the pivot portions 206, 210).

When the example joint 130 of FIG. 3 is assembled, the first male connectors 323, 324 of the inner and outer housing 200, 204 are disposed in the first female connectors 310 of the middle housing 202. The example second male connectors 325, 326 are disposed in the second female connectors 312 of the middle housing 202. When the example joint 130 and the frame 102 are in an operable position, the notches 327, 328 of the inner and outer housings 200, 204 align with and abut the notch 314 of the middle housing 202, and the plunger 318 is disposed in these notches 314, 327, 328 to substantially preclude relative movement between the pivot portions 206, 208, 210.

Figure 4:
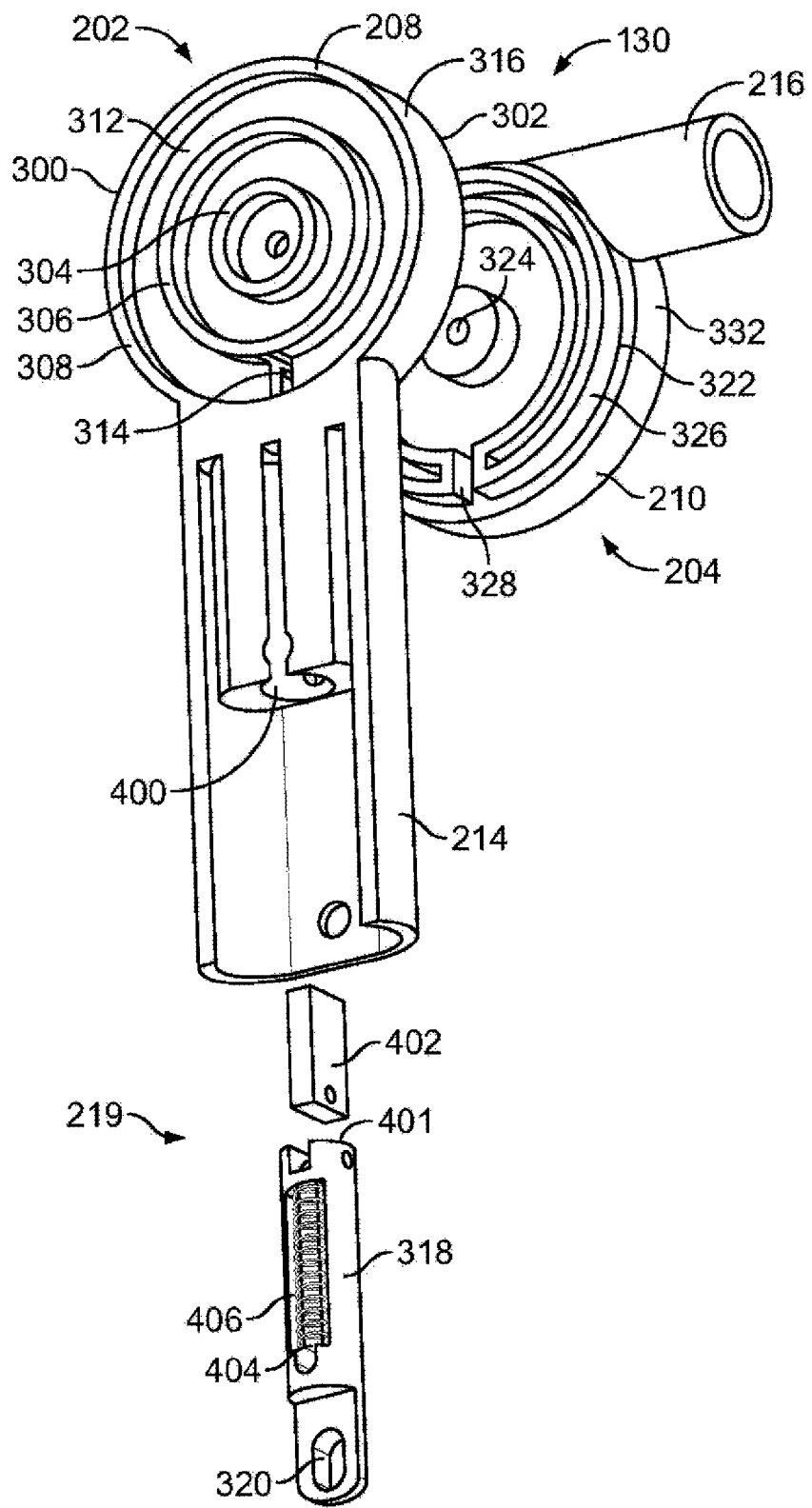
FIG. 4 is a cross-sectional view a middle housing of the joint of FIG. 3.

FIG. 4 is a cross-sectional view of the example middle housing 202 of FIG. 3. The example receptacle 214 of the middle housing 202 includes a socket 400 to receive the plunger 318. The example plunger 318 of FIG. 4 includes a locking bar 402 disposed at an end 401 of the plunger 318 adjacent the pivot portion 208 of the middle housing 202. When the example joint 130 is in a locked state, the locking bar 402 of the plunger 318 is disposed in the notches 314, 327, 328 of the housings 200, 202, 204. In the illustrated example, the locking bar 402 is coupled to the end 401 of the plunger 318 via one or more mechanical fasteners. In some examples, the locking bar 402 and the plunger 318 are integrally formed. The example plunger 318 of FIG. 4 includes a slot 404 to receive a spring 406. The spring 406 is compressed between a seat (e.g., a POP® rivet) and an inner surface of the plunger 318 to urge the plunger 318 toward the notch 314.

When the example frame 102 is in an operable position, the notches 327, 328 of the inner and outer housings 200, 202 align with the notch 314 of the middle housing 202, and the locking bar 402 of the plunger 318 is urged into the notches 314, 327, 328 by the spring 406. As a result, the locking bar 402 obstructs movement of the inner and out housings 200, 204 to prevent the inner and outer housings 200, 204 from rotating relative to the middle housing 202. In this manner, the example locking mechanism 219 locks the frame 102 in an unfolded, operable position. When a user actuates the lever 220 via the cable 132, the lever 220 pivots such that its distal end seated in aperture 320 of the plunger 318 moves downward to move the plunger 318 away from the pivot portions 206, 208, 210 (e.g., the lever 220 pulls the plunger downward). As a result, the locking bar 402 moves out of the notches 314, 327, 328, and the inner housing 200 and the outer housing 204 are free to rotate relative to the middle housing 202.

Figure 5A:
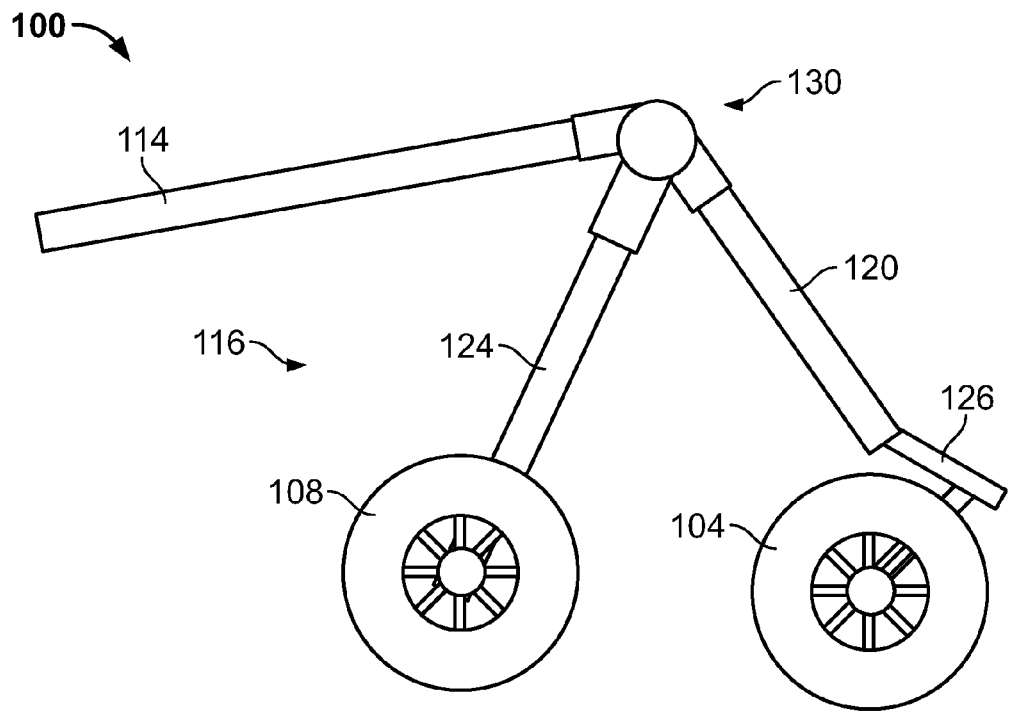
FIG. 5A is a schematic, side view of the example stroller of FIG. 1 in a semi-folded position.

FIG. 5A is a schematic, side view of the example stroller 100 of FIG. 1 in a semi-folded position. In the illustrated example, the arms 112, 114 and the front legs 118, 120 are rotated toward the rear wheels 106, 108. In the illustrated example, if the cable 132 is lifted relative to Earth to actuate the lever 220, the arms 112, 114 and the front legs 118, 120 rotate toward the rear wheels via gravity. Thus, the example stroller 100 may be folded using one hand.

Figure 5B:
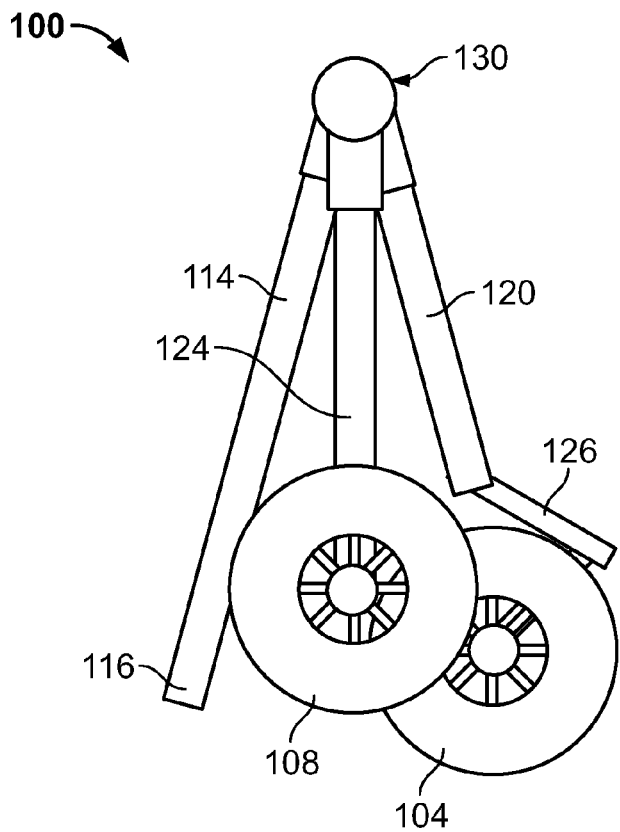
FIG. 5B is a schematic, side view of the example stroller of FIG. 1 in a folded position.

FIG. 5B is a schematic, side view of the example stroller 100 of FIG. 1 in a folded position. When the example stroller 100 is in the folded position, the arms 112, 114 and the front legs 118, 120 are disposed adjacent the rear legs 122, 124. As a result, a size (e.g., form factor) of the example stroller 100 in the folded position is less than the size of the example stroller 100 in the unfolded position. In this manner, the example folding strollers disclosed herein may be folded to be conveniently stored and/or transported (e.g., in an automobile).

Figure 6:
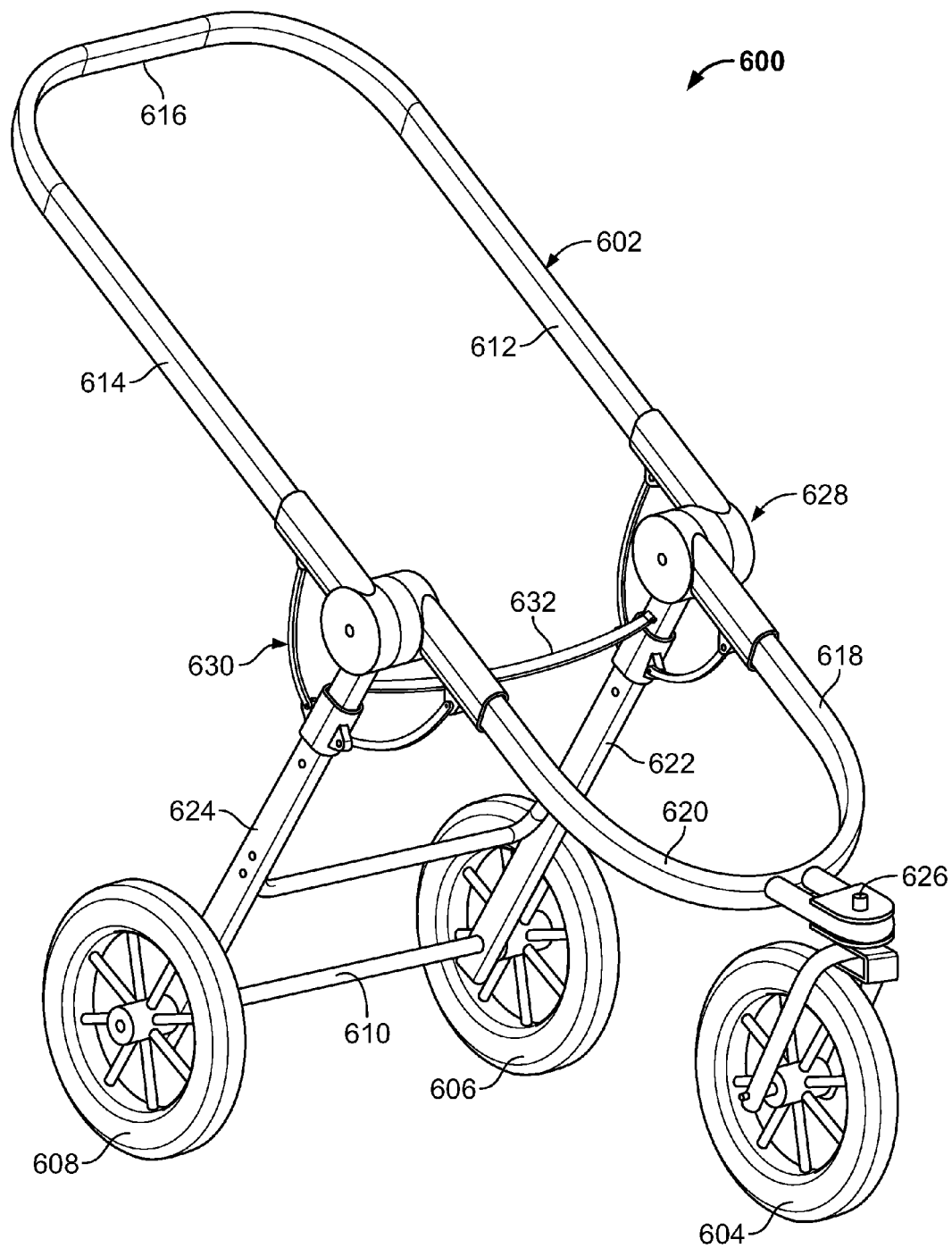
FIG. 6 is a left, front perspective view of another example stroller disclosed herein.

FIG. 6 illustrates another example stroller 600 disclosed herein. The example stroller 600 of FIG. 6 includes a frame 602, a front wheel 604, and two rear wheels 606, 608. Different numbers of front and/or rear wheels are used in other examples. The example stroller 600 also includes a rear axle 610 coupled to the rear wheels 606, 608. The example frame 602 of FIG. 6 includes a left side and a right side having a plurality of frame members. In the illustrated example, the frame members of each side include an arm 612, 614 extending from a handle 616, a front leg 618, 620, and a rear leg 622, 624. In some examples, the arms 612, 614 and the handle 616 are integrally formed from a unit such as, for example, a tube.

In the illustrated example, the stroller 600 is in an unfolded, operative position in which each of the rear legs 622, 624 extends upwardly from the rear axle 610 and toward the front wheel 604. In some examples, the front legs 618, 620 are integrally formed from a unit such as, for example, a tube. In the illustrated example, the front legs 618, 620 are coupled to a mount 626 from which the front wheel 604 is mounted. The example front legs 618, 620 extend from the mount 626 upwardly in the orientation of FIG. 6 and toward the rear wheels 606, 608. In some examples, the front legs 618, 620 and the arms 612, 614 are substantially aligned when the example stroller 600 is in the unfolded, operative position. For example, the central longitudinal axis of a front leg 618 is aligned with the central longitudinal axis of the arm 612 in some implementations when the stroller 100 is unfolded in the operative position. Thus, the front leg 618 may be aligned with and/or parallel to the arm 612 and the front leg 620 may be aligned with and/or parallel to the arm 614. In some examples, the front legs 618, 620 and/or the arms 612, 614 are substantially perpendicular to the rear legs 622, 624 when the example stroller 600 is in the unfolded operative position.

Each side of the frame 602 also includes a joint 628, 630. The example right joint 628 is a mirror image of the left joint 630. A cable or strap 632 is coupled to the joints 628, 630. As described in greater detail below, when a user pulls the cable 632, the joints 628, 630 unlock to enable the arms 612, 614 and front legs 618, 620 to rotate relative to the rear legs 622, 624 to fold the example stroller 600.

Figure 7:
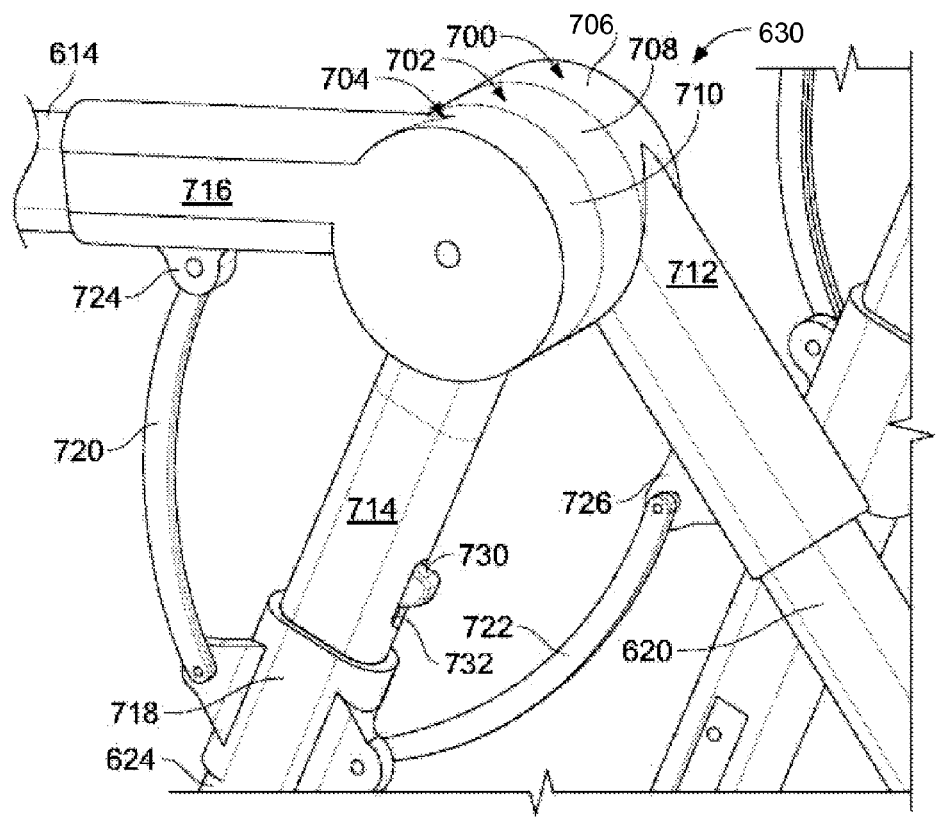
FIG. 7 is an enlarged view of the left joint of the example stroller of FIG. 6; the right joint being a mirror image thereof.

FIG. 7 is an enlarged view of the example joint 630 of the left side of the example stroller 600 of FIG. 6 in a semi-folded position. Because the left and right joints 628, 630 are mirror images, the description of left joint 630 is applicable to the right joint 628. Thus, to avoid redundancy, joint 628 is not separately described.

The example joint 630 of FIG. 7 includes an inner housing 700, a middle housing 702, and an outer housing 704. Each of the example housings 700, 702, 704 includes a pivot portion 706, 708, 710 and a receptacle 712, 714, 716. The example pivot portions 706, 710 of the inner and outer housings 700, 704 are rotatably coupled to the pivot portion 708 of the middle housing 702. The example receptacles 706, 708, 710 receive one of the front legs 618, 620, the rear legs 622, 624, or the arms 612, 614. In the illustrated example, the receptacle 712 of the inner housing 700 receives an upper end of the front leg 620; the receptacle 714 of the middle housing 702 receives an upper end of the rear leg 624; and the receptacle 716 of the outer housing 704 receives a lower end of the arm 614. In other examples, the middle housing 702 is fixed to the front leg 620 or the arm 614.

In the illustrated example of FIG. 7, a sleeve 718 is slidably coupled to the rear leg 624 and/or the receptacle 714 of the middle housing 708. The example joint 630 also includes a first link 720 and a second link 722. The example first link 720 is pivotably coupled to the sleeve 718 and to the receptacle 716 of the outer housing 704. The example second link 722 is pivotably coupled to the sleeve 718 and to the receptacle 712 of the inner housing 700. Thus, the links 720, 722 and the sleeve 718 operatively couple the arm 614 to the front leg 620. In the illustrated example, the first link 720 and the second link 722 are pivotably coupled to the receptacles 716, 712, respectively, via anchors 724, 726. The example anchors 724, 726 of the illustrated example of FIG. 7 extend from the respective receptacles 716, 712 such that when the example stroller 600 is in an operable state, the receptacles 712, 716 extend substantially parallel to the rear leg 624. In the illustrated example, the first and second links 720, 722 are curved. However, the links 720, 722 have other shapes in other examples.

In the illustrated example, a locking lever 730 is partially disposed inside the receptacle 714 of the middle housing 702. When the example stroller 600 is in an operable state, a portion of the locking lever 730 extends through an aperture or slot 732 of the receptacle 714 to engage the sleeve 718. When the locking lever 730 engages the sleeve 718, the locking lever 730 holds the sleeve 718 substantially stationary relative to the rear leg 624 to enable the links 720, 722 to support the arm 614 and the front leg 620 in the unfolded position. When the locking lever 730 is disengaged from the sleeve 718 (e.g., by moving the portion of locking lever 730 into the receptacle 714), the stroller 600 may be folded from the unfolded, operative position to the folded position. In the illustrated example, the sleeve 718 moves (e.g., along the rear leg 624) with the arm 614 and the front leg 620 via the links 720, 722, respectively, as the arm 614 and the front leg 620 rotate from the unfolded position to the folded position. Thus, the example sleeve 718 is a follower. In the illustrated example, if the arm 614 is rotated toward the rear leg 624 (e.g., via gravity and/or a user applying a force to the handle 616), the first link 720 applies a force to the sleeve 624, urging the sleeve 718 toward the rear wheel 608. When the sleeve 718 is urged toward the rear wheel 608, the example sleeve 718 pulls the front leg 620 toward the rear leg 624 via the second link 722. In this manner, the sleeve 624 and the links 720, 722 coordinate movement of the arm 614 and the front leg 620 to enable the arm 614 and the front leg 620 to rotate together.

Figure 8:
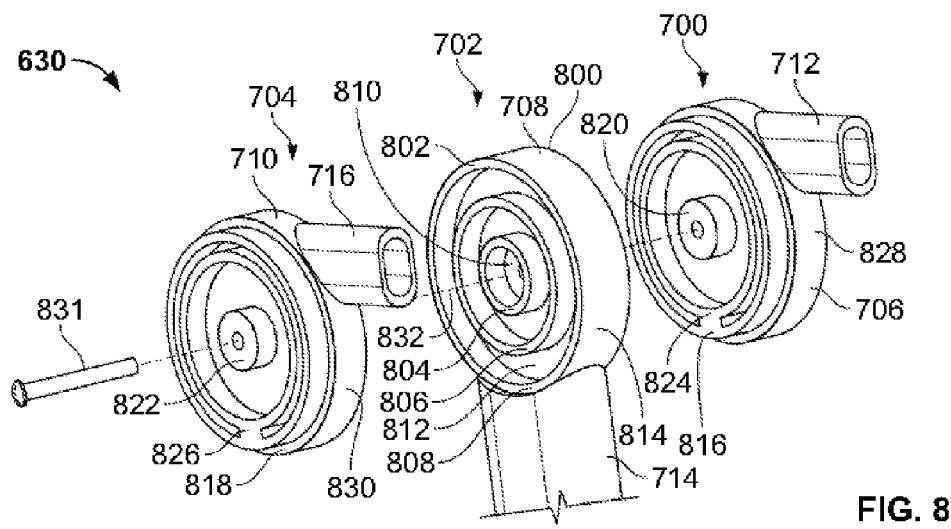
FIG. 8 is an exploded view of a portion of the example left joint of FIG. 7.

FIG. 8 is an exploded view of a portion of the example joint 630 of FIG. 7. To facilitate the following discussion of the example joint 630, the outer housing 704 is shown rotated about 180 degrees from its operational position (e.g., a position in which the outer housing 704 is coupled to the middle housing 702). The example pivot portion 708 of the middle housing 702 is disk-shaped and includes opposing sides 800, 802 facing the inner housing 700 and the outer housing 704, respectively. However, in other examples, the pivot portion 708 has other shapes. The example sides 800, 802 of the example pivot portion 708 are substantially identical. Each of the example sides 800, 802 includes three annular, substantially concentric ridges 804, 806, 808. In the illustrated example, the first annular ridge 804 defines a first female connector 810. The example second annular ridge 806 and the example third annular ridge 808 define a second female connector 812. In the illustrated example, the receptacle 714 extends from an outer, circumferential surface 814 of the pivot portion 708.

The example pivot portions 706, 710 of the inner and outer housings 700, 704 of the example joint 630 are also disk-shaped. However, the pivot portions 706, 710 have other shapes in other examples. Each of the example pivot portions 706, 710 of the inner and outer housings 700, 704 of the illustrated example includes a side 816, 818 to engage a respective one of the sides 800, 802 of the pivot portion 708 of the middle housing 702. Each of the example sides 816, 818 of the pivot portions 706, 710 of the inner and outer housings 700, 704 includes a first male connector 820, 822 and a second male connector 824, 826. The example first male connectors 820, 822 of FIG. 8 are cylindrically-shaped and disposed on about a center of the sides 816, 818, respectively. In the illustrated example, the second male connectors 824, 826 are annular ridges, which are substantially concentric to the first male connectors 820, 822. However, the male connectors 820, 822, 824, 826 have other shapes in other examples. In the illustrated example, the receptacles 712, 716 of the inner and outer housings 700, 704 extend from an outer, circumferential surface 828, 830 of the pivot portions 706, 710 along a chord of the pivot portions 706, 710 (e.g., perpendicular to an axis of rotation 832 of the pivot portion 706, 710).

When the example joint 630 is assembled, the first male connectors 820, 822 of the inner and outer housing 700, 704 are disposed in the first female connectors 810 of the middle housing 702, and the second male connectors 824, 826 are disposed in the second female connectors 812. In the illustrated example, a fastener 834 (e.g., a POP® rivet, a bolt, and/or any other suitable fastener) extends through the inner, middle, and outer housings 700, 702, 704 along the axis of rotation 832 of the pivot portions 706, 708, 710. The example fastener 834 rotatably couples the inner and outer housings 700, 704 to the middle housing 702 and enables the front leg 620 and the arm 614 to rotate about the axis of rotation 832 via the pivot portions 706, 708, 710.

Figure 9:
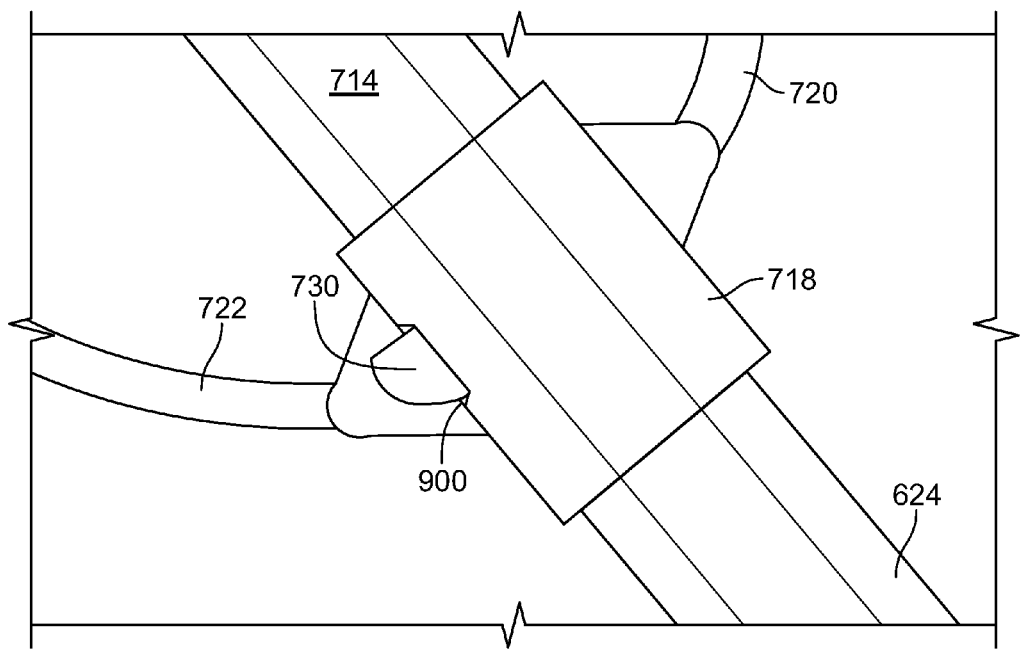
FIG. 9 is a schematic view of a sleeve and a locking lever of the example joint of FIG. 7 in a locked state.

FIG. 9 is a side view of the lever 730 and the sleeve 718 of FIG. 7 shown in a locked state. The sleeve 718 of the illustrated example defines a slot 900. When the example joint 630 is in the locked state, the slot 732 of the receptacle 714 and the slot 900 of the sleeve 718 are substantially aligned such that the example lever 730 extends though both of the slots 900, 732. As a result, the sleeve 718 is held substantially stationary relative to the rear leg 624 via the lever 730, thereby enabling the links 720, 722 and the sleeve 718 to support the front leg 620 and the arm 614, respectively, and hold the example stroller 600 in the operable, unfolded position.

Figure 10:
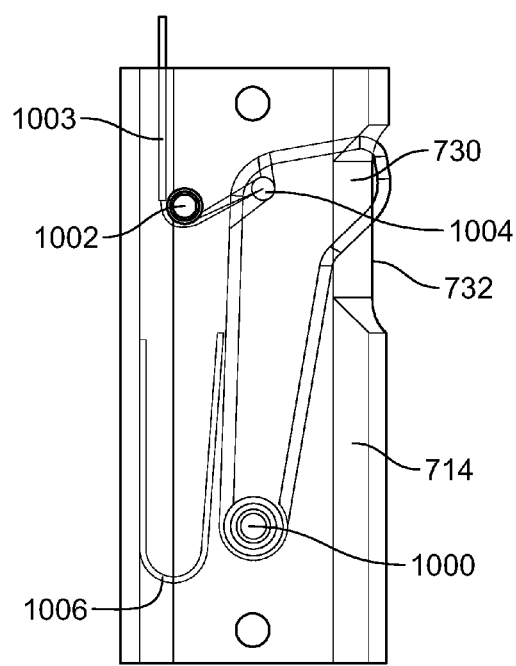
FIG. 10 is a schematic view showing the locking lever of FIG. 9 in an unlocked state.

FIG. 10 is a schematic view showing the locking lever 730 in an unlocked state. In the illustrated example, the lever 730 is pivotably coupled to the receptacle 714 via a pivot 1000. The example receptacle 714 of FIG. 10 includes a pulley 1002 about which a cable 1003 is tensioned. In the illustrated example, the cable 1003 is coupled to the strap 632 (FIG. 6). In the illustrated example, the pulley 1002 is a fixed pulley (e.g., a pin). In other examples, the pulley 1002 is a movable pulley. The example lever 730 of FIG. 10 includes an aperture 1004 to receive the cable 1003, and the cable 1003 is coupled to the lever 730 via one or more chemical (e.g., glue, etc.) or mechanical fasteners (e.g., a knot, weld, etc). A spring 1006 (e.g., a spring clip, a coil spring, etc.) urges the lever 730 toward the slot 732 of the receptacle 714. As illustrated in FIG. 10, when a user pulls the strap 632, the lever 730 rotates about the pivot 1000 via the cable 1003 such that the example lever 730 is withdrawn into the receptacle 714 and out of the slot 900 of sleeve 718. As a result, the sleeve 718 is free to slide along the receptacle 714 and the rear leg 624, and the links 720, 722 do not substantially support the front leg 620 and the arm 614, respectively. Thus, the inner and outer housings 700, 704 are then free to rotate relative to the middle housing 702.

Figure 12:
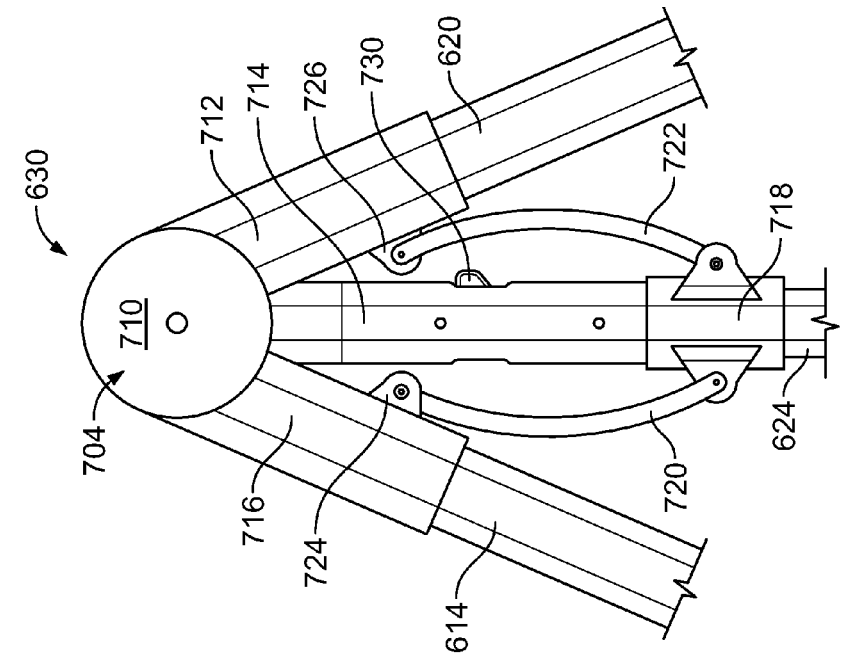
FIG. 12 is a side, schematic view of the left joint of the example stroller of FIG. 11.
Figure 11:
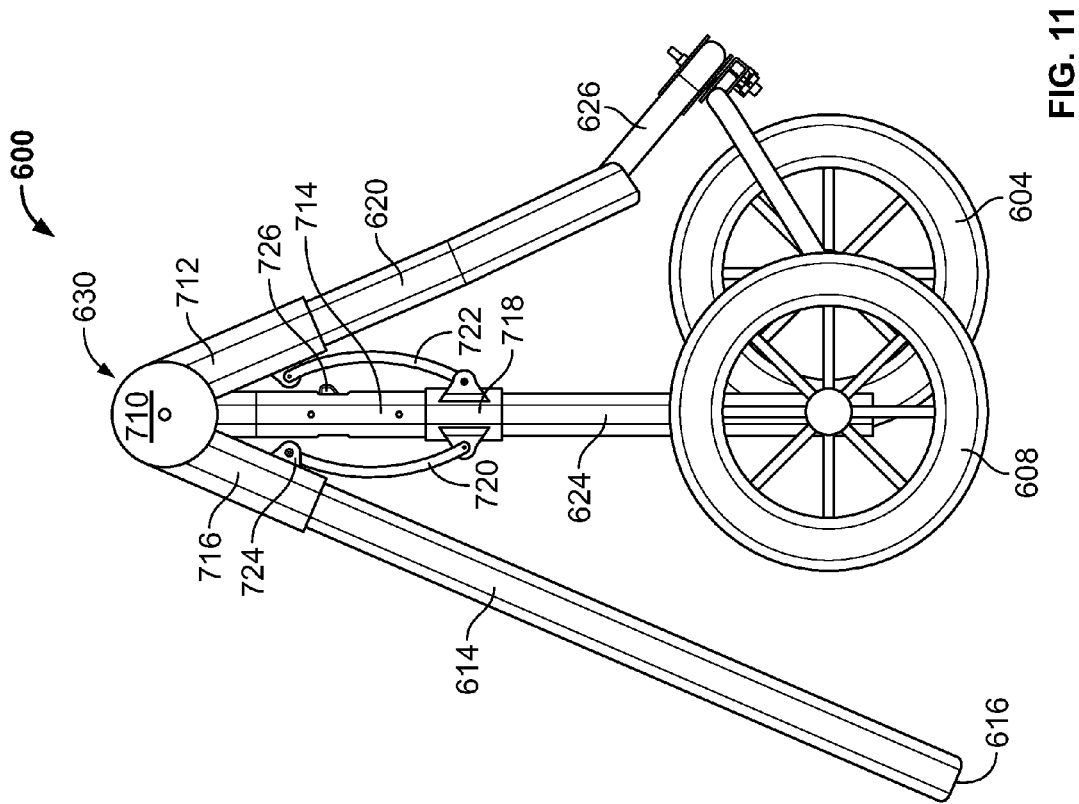
FIG. 11 is a side view of the example stroller of FIG. 6 in a folded position.

FIGS. 11 and 12 depict the example stroller 600 in a folded position. When the lever 730 is withdrawn from the slot 900 of the sleeve 718, the arm 614 and the front leg 620 may rotate toward the rear leg 624 to drive the sleeve 718 downward in the orientation of FIG. 11 (e.g., by weight of the arm 614 and the front leg 620 transferred to the sleeve 718 via the links 720, 722). In the illustrated example, when the sleeve 718 is driven downward, the links 720, 722 rotate such that ends of the links 720, 722 coupled to the respective anchors 724, 726 move toward the receptacle 714 of the middle housing 702 with the arm 614 and the front leg 620. Thus, the links 720, 722 operatively couple the arm 614 to the front leg 620 to enable the arm 614 and the front leg 620 to rotate together in opposite directions. In some examples, when the example stroller 600 is in the folded position, the anchors 724, 726 contact the receptacle 714 of the middle housing 702. In other examples, the front wheel 604 contacts the axle 610 when the example stroller 600 is in the folded position such that the example anchors 724, 726 do not contact the receptacle 714. In the illustrated example, the sleeve 718 of the example joint 630 is driven below the lever 730 in the orientation of FIGS. 11 and 12, and the front leg 620 and the arm 614 are rotated toward the rear leg 624. Thus, the example strollers disclosed herein fold to be conveniently stored and/or transported.

Figure 13:
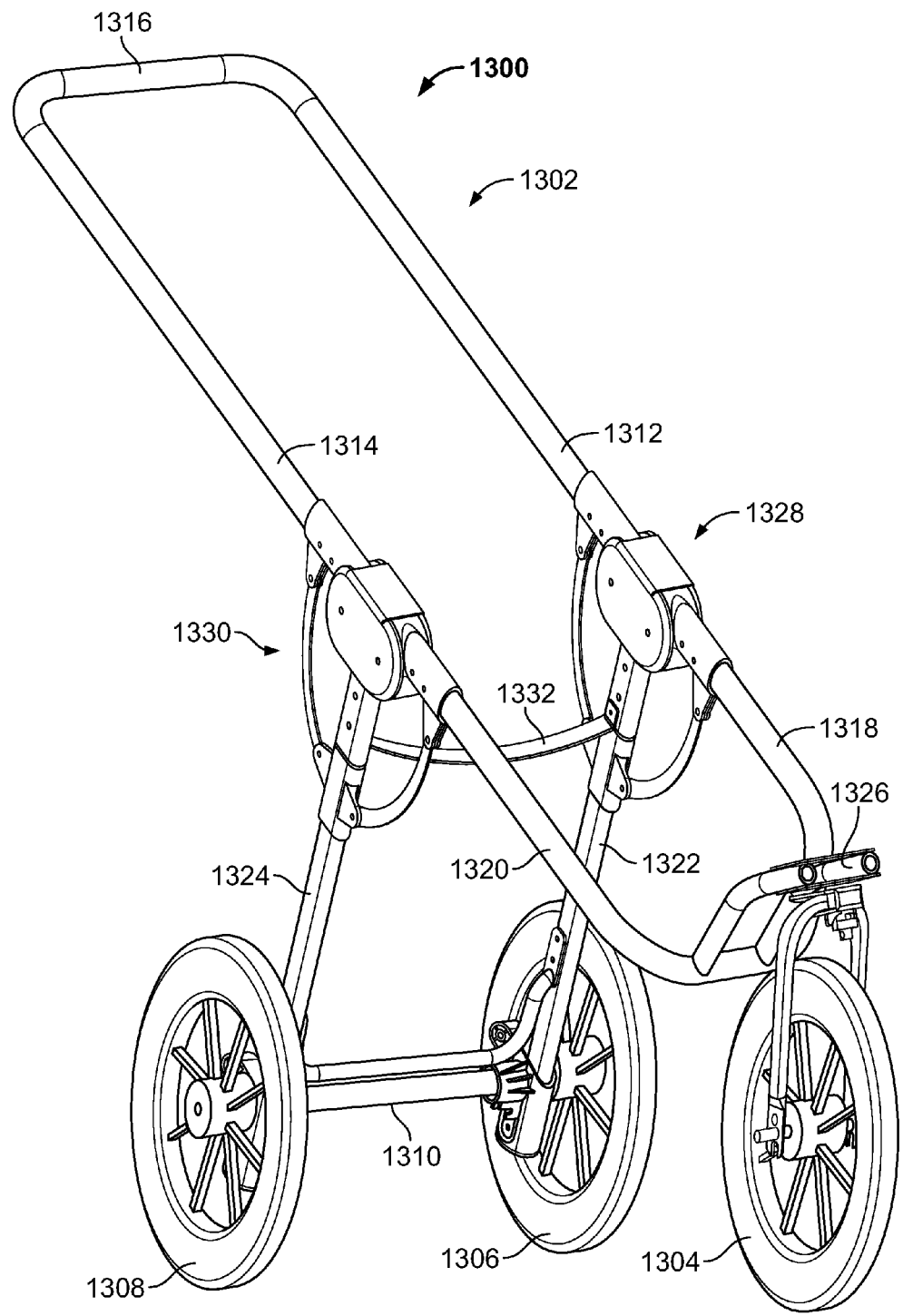
FIG. 13 is a left, front perspective view of another example stroller disclosed herein.

FIG. 13 illustrates another example stroller 1300 disclosed herein. The example stroller 1300 of FIG. 13 includes a frame 1302, a front wheel 1304, and two rear wheels 1306, 1308. Different numbers of front and/or rear wheels are used in other examples. The example stroller 1300 of FIG. 13 includes a rear axle 1310 coupled to the rear wheels 1306, 1308. The frame 1302 includes a left side and a right side having a plurality of frame members. In the illustrated example, the frame members of each side include an arm 1312, 1314 extending from a handle 1316, a front leg 1318, 1320, and a rear leg 1322, 1324. In some examples, the arms 1312, 1314 and the handle 1316 are integrally formed from a unit such as, for example, a tube. In the illustrated example, when the example stroller 1300 is in the orientation of FIG. 13, each of the rear legs 1322, 1324 extends upwardly and forwardly from the rear axle 1310. In some examples, the front legs 1318, 1320 are integrally formed from a unit such as, for example, a tube. In the illustrated example, the front legs 1318, 1320 are coupled to a mount 1326. The front wheel 1304 is pivotably coupled to the mount 1326. In the illustrated example, when the example stroller 1300 is in the orientation of FIG. 13, the front legs 1318, 1320 extend from the mount 1326 upwardly and rearwardly. In some examples, the front legs 1318, 1320 are substantially aligned with the arms 1312, 1314 when the example stroller 1300 is in an unfolded, operative position as shown in FIG. 13. For example, in some implementations the central longitudinal axis of a front leg 1318 is aligned with the central longitudinal axis of the arm 1312, when the stroller 1300 is unfolded in the operative position. Thus, the front leg 1318 may be aligned with and/or parallel to the arm 1312 and the front leg 1320 may be aligned with and/or parallel to the arm 1314. In some examples, the front legs 1318, 1320 and/or the arms 1312, 1314 are substantially perpendicular to the rear legs 1322, 1324 when the example stroller 1300 is in the unfolded, operative position.

Each side of the frame 1302 also includes a joint 1328, 1330. The example right joint 1328 is a mirror image of the example left joint 1330. In the illustrated example, a cable or strap 1332 is operatively coupled to the joints 1328, 1330. As described in greater detail below, when a user pulls the strap 1332 with sufficient force, the arms 1312, 1314 and front legs 1318, 1320 are released for rotation relative to the rear legs 1322, 1324.

Figure 14:
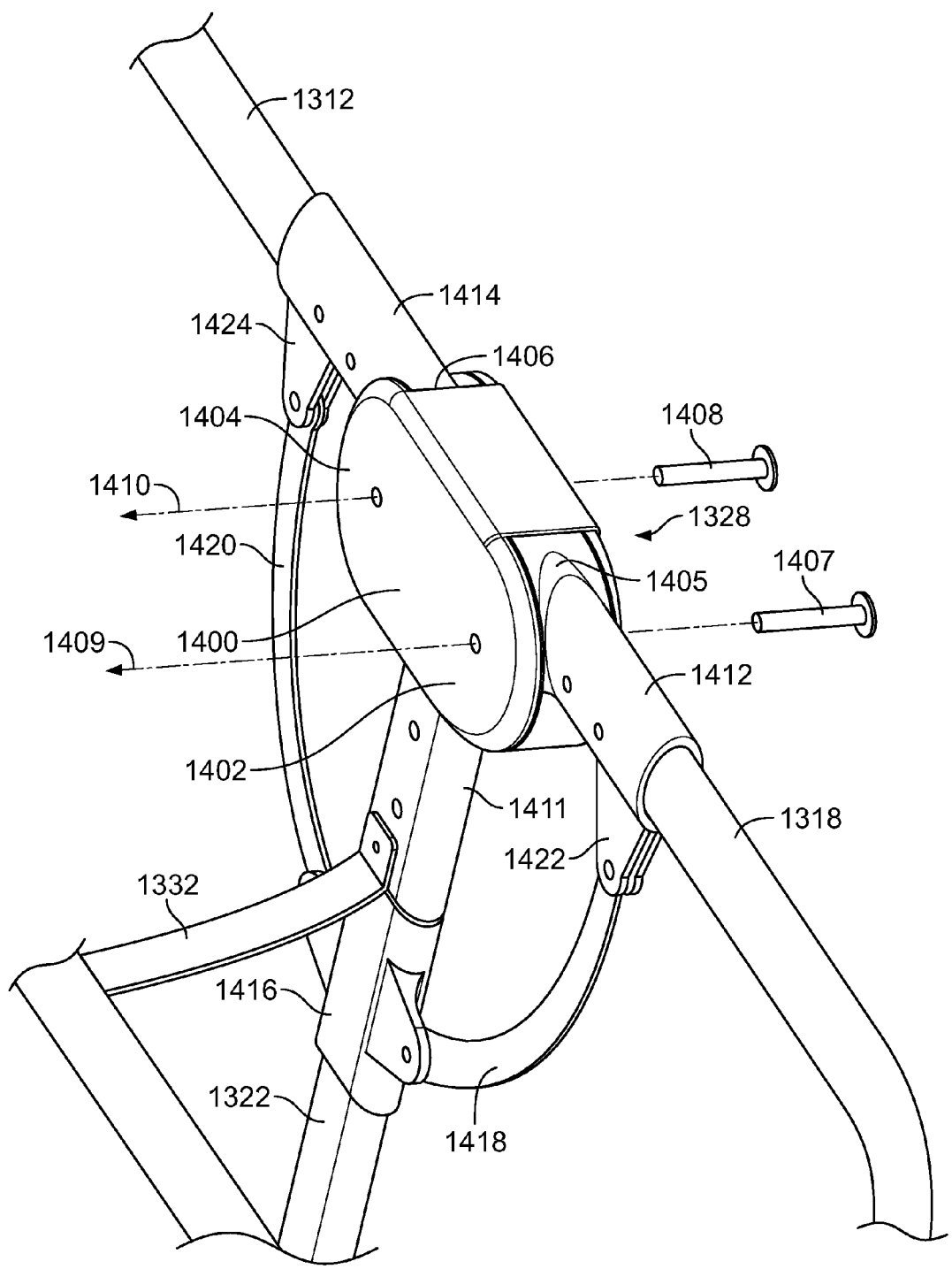
FIG. 14 is an enlarged view of the right joint of the example stroller of FIG. 13; the left joint being a mirror image thereof.

FIG. 14 illustrates the right joint 1328 of the example stroller 1300 of FIG. 13. Because the right joint 1328 and the left joint 1330 are mirror images, the description of the right joint 1328 is applicable to the left joint 1330. Thus, to avoid redundancy, joint 1330 is not separately described.

In the illustrated example of FIG. 14, the right joint 1328 includes a housing 1400. The housing 1400 of the illustrated example includes a first fulcrum 1402 and a second fulcrum 1404. A first pivot 1405 and a second pivot 1406 are rotatably coupled to the first fulcrum 1402 and the second fulcrum 1404, respectively. In the illustrated example, rivets 1407, 1408 and/or any other suitable fasteners rotatably couple the first and second pivots 1405, 1406 to the fulcrums 1402, 1404 and provide respective first and second axes of rotation 1409, 1410 of the first and second pivots 1405, 1406. Thus, the example right joint 1328 enables the front leg 1318 and the arm 1312 to rotate about different axes of rotation 1409, 1410 to fold the stroller 1300 from the unfolded, operative position to a folded position. In the illustrated example, the first and second axes of rotation 1409, 1410 defined by the rivets 1407, 1408 are substantially parallel.

The example housing 1400 and the example first and second pivots 1405, 1406 each includes a receptacle 1411, 1412, 1414. The example receptacles 1411, 1412, 1414 receive respective ones of the front legs 1318, 1320, the rear legs 1322, 1324, and/or the arms 1312, 1314. In the illustrated example, the receptacle 1411 of the housing 1400 receives an upper end of the rear leg 1322; the receptacle 1412 of the first pivot 1405 receives an upper portion of the front leg 1318; and the receptacle 1414 of the second pivot 1408 receives a lower portion of the arm 1312. In other examples, the housing 1400 is fixed to the front leg 1318 or the arm 1312.

The example joint 1328 of FIG. 14 includes a sleeve 1416 slidably coupled to the rear leg 1322 and the receptacle 1411 of the housing 1400. The example joint 1328 also includes a first link 1418 and a second link 1420. The example first link 1418 of FIG. 14 is pivotably coupled to the sleeve 1416 and the receptacle 1412 of the first pivot 1405. The example second link 1420 of FIG. 14 is pivotably coupled to the sleeve 1416 and the receptacle 1414 of the second pivot 1408. Thus, the example sleeve 1416 and the example links 1418, 1420 operatively couple the front leg 1318 to the arm 1312. In the illustrated example, the links 1418, 1420 are coupled to the respective ones of the receptacles 1412, 1414 via anchors 1422, 1424. The example anchors 1422, 1424 of the illustrated example of FIG. 14 extend from the respective ones of the receptacles 1412, 1414 such that when the example stroller 600 is in the operable, unfolded state, the anchors 1422, 1424 are substantially parallel to the rear leg 1322. The example first and second links 1418, 1420 of FIG. 14 are curved. In other examples, the first and second links 1418, 1420 are substantially straight or have other shapes. When the example joint 1328 of FIG. 14 is in a locked state, the example sleeve 1416 and the example links 1418, 1420 support the front leg 1318 and the arm 1312, respectively, and hold the example stroller 1300 in an unfolded, operative position.

Figure 15:
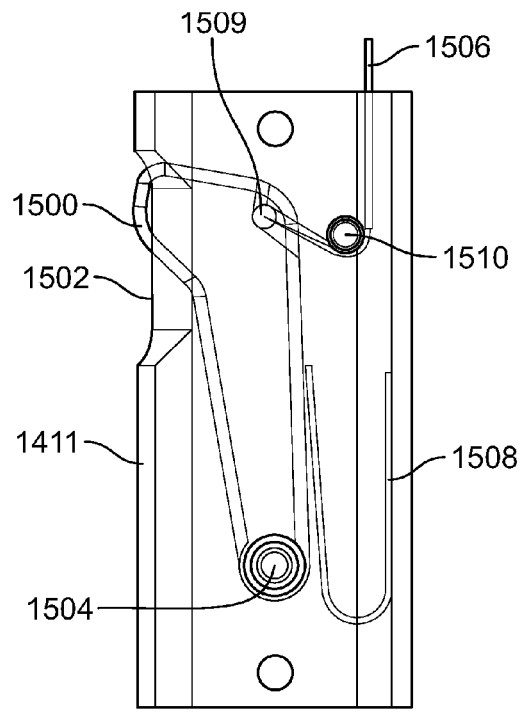
FIG. 15 is an enlarged, schematic view of a locking lever of the example joint of FIG. 14 in an unlocked state.

FIG. 15 is an enlarged, schematic view of an example locking lever 1500 disposed in the example receptacle 1411 of the housing 1400. In the illustrated example, the lever 1500 is in an unlocked state in which the lever 1500 is withdrawn into the receptacle 1411. The example receptacle 1411 defines a first aperture or slot 1502 through which the lever 1500 is to extend to engage the sleeve 1416 when the lever 1500 is in a locked state. The example lever 1500 of FIG. 15 is pivotably coupled to the receptacle 1411 via a pivot 1504. A first end of a cable 1506 is coupled to the example lever 1500, and a spring 1508 (e.g., a spring clip, a coil spring, etc.) urges the lever 1500 toward the first slot 1502 of the receptacle 1411. In the illustrated example, the lever 1500 includes an aperture 1509 to receive the cable 1506, and the cable 1506 is coupled to the lever 1500 via one or more chemical (e.g., glue) or mechanical fasteners (e.g., a knot, holding screw etc.). A second end of the cable 1506 is coupled to the strap 1332. In the illustrated example, the receptacle 1411 includes a pulley 1510 about which the example cable 1506 is tensioned. In the illustrated example, the pulley 1510 is a fixed pulley (e.g., a pin). In other examples, the pulley 1510 is a movable pulley. When a user pulls the strap 1322, the example lever 1500 rotates about the example pivot 1504 such that the lever 1500 withdraws into the receptacle 1410 to disengage the sleeve 1416. As a result, the example sleeve 1416 is free to move along the receptacle 1411 and the rear leg 1322, thereby enabling the links 1418, 1420 and the example pivots 1405, 1406 to rotate relative to the housing 1400. In this manner, the example stroller 1300 may be folded from the unfolded position to the folded position.

Figure 16:
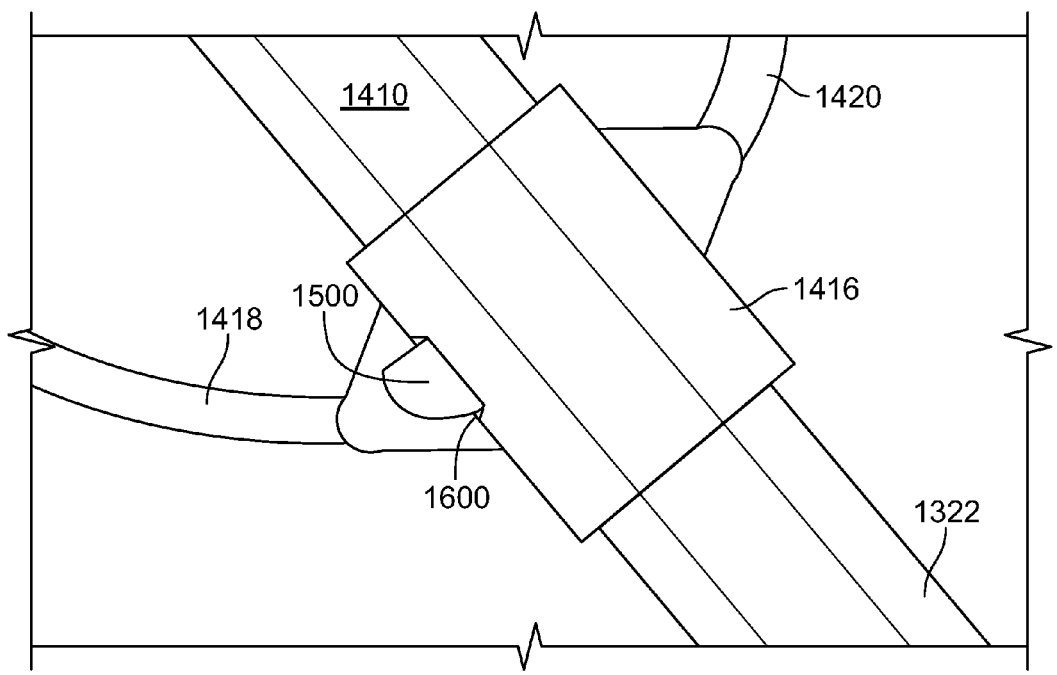
FIG. 16 is a side view showing the locking lever of FIG. 15 and a sleeve of the example joint of FIG. 14 in a locked state.

FIG. 16 is a side view showing the example locking lever 1500 in a locked state in which the locking lever 1500 engages the sleeve 1416 to lock the joint 1328 in the unfolded position. The example sleeve 1416 defines a second aperture or slot 1600. When the example joint 1328 is in the locked state, the first slot 1502 of the receptacle 1411 and the second slot 1500 of the sleeve 1416 are substantially aligned such that the lever 1500 extends though both of the first slot 1502 and the second slot 1600 under the influence of the spring 1508. As a result, the sleeve 1416 is held substantially stationary relative to the rear leg 1322 via the lever 1500, thereby enabling the links 1418, 1420 to support the front leg 1318 and the arm 1312, respectively, and hold the example stroller 1300 in the operable position.

Figure 17:
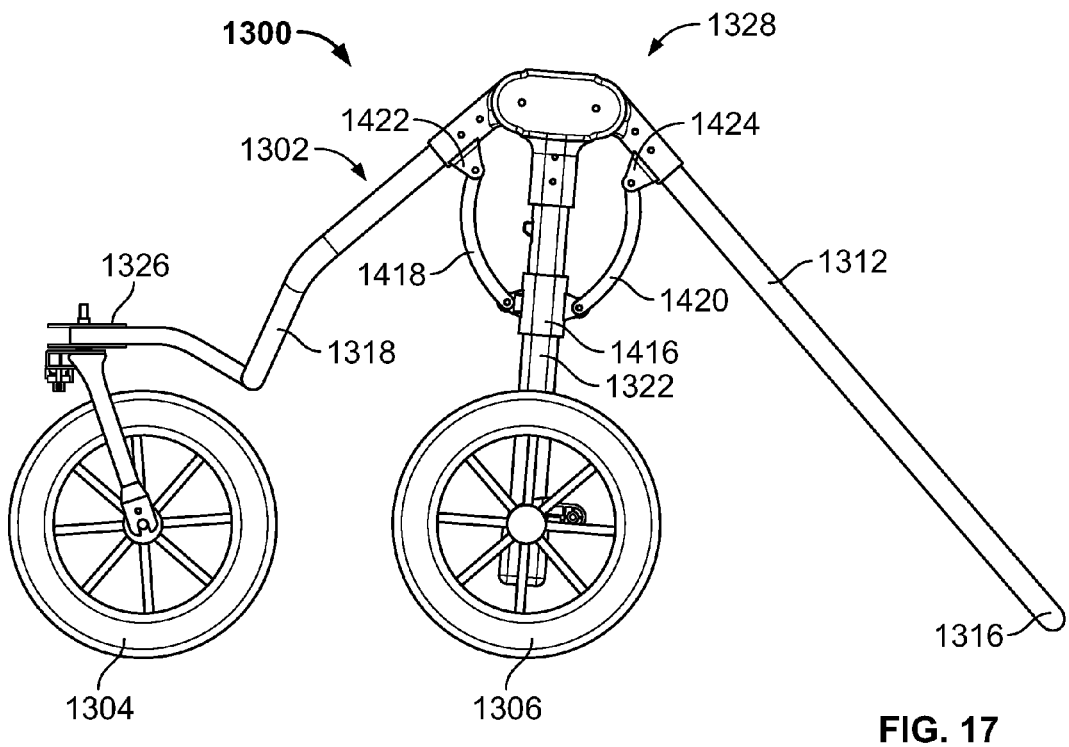
FIG. 17 is a side view of the example stroller of FIG. 13 in a semi-folded position.
Figure 18:
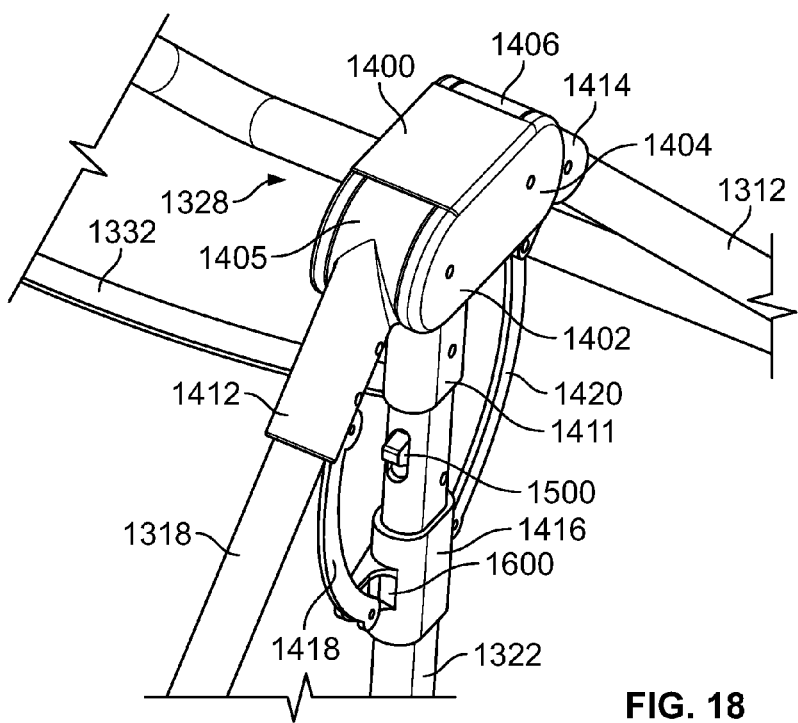
FIG. 18 is a left, front perspective view of the right joint of the example stroller of FIG. 17.

FIGS. 17 and 18 depict the example stroller 1300 in a semi-folded position. When the lever 1500 is withdrawn from the second slot 1600 of the sleeve 1416, the sleeve 1416 may be driven downward in the orientation of FIG. 17 (e.g., by weight of the arm 1312 and the front leg 1318 transferred to the sleeve 1416 via the links 1418, 1420). In the illustrated example, when the sleeve 1416 is driven downward, the links 1418, 1420 rotate such that ends of the links 1418, 1420 coupled to the anchors 1422, 1424 move toward the receptacle 1411 with the front leg 1318 and the arm 1312, respectively. Thus, the links 1418, 1420 and the sleeve 1416 operatively couple the arm 1312 to the front leg 1318 to enable the arm 1312 and the front leg 1318 to rotate together toward the rear leg 1322. In the illustrated examples of FIGS. 17 and 18, the sleeve 1416 is a follower and moves as the arm 1312 and the front leg 1318 rotate. In the illustrated examples, the sleeve 1416 is positioned below the lever 1500 in the orientation of FIGS. 17 and 18, and the front legs 1318, 1320 and the arms 1312, 1314 are rotated toward the rear legs 1322, 1324 from the unfolded, operative position.

Figure 20:
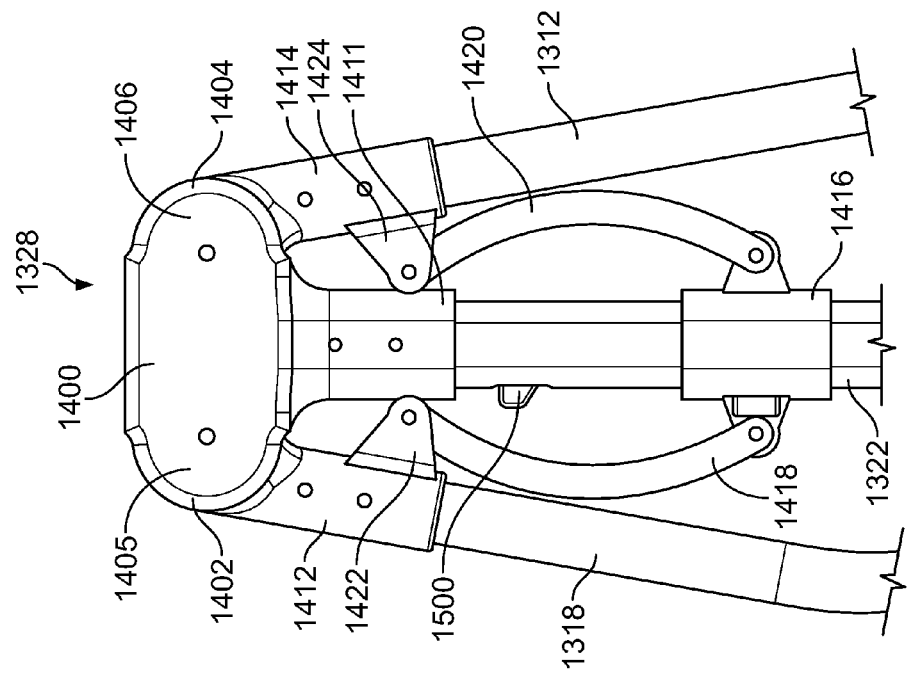
FIG. 20 is a side, schematic view of the right joint of the example stroller of FIG. 19.
Figure 19:
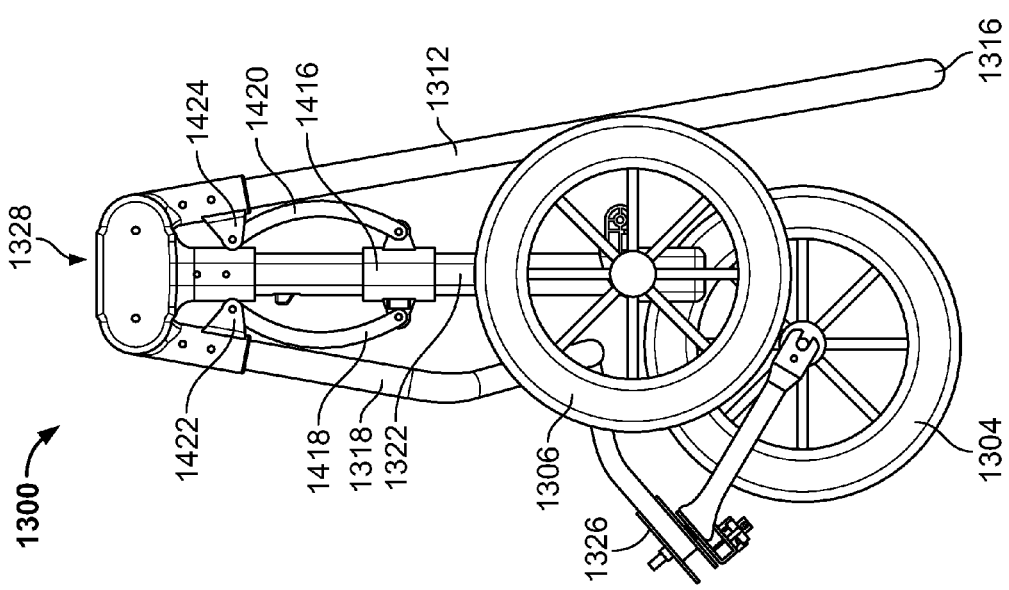
FIG. 19 is a side view of the example stroller of FIG. 17 in a fully-folded position.

FIGS. 19 and 20 illustrate the example stroller 1300 in the folded position. In the illustrated example, when the stroller 1300 is in the folded position, the links 1418, 1420 are rotated such that the anchors 1422, 1424 are in contact with the receptacle 1411 of the housing 1400. In other examples, the front wheel 1304 contacts the axle 1310 when the example stroller 1300 is in the folded position such that the example anchors 1422, 1424 do not contact the receptacle 1411. When the example stroller 1300 is in the folded position, a size (e.g., form factor) of the stroller 1300 is smaller than a size of the stroller 1300 in the unfolded position. Thus, the example stroller 1300 folds to be conveniently stored and/or transported (e.g., in an automobile).

Figure 21:
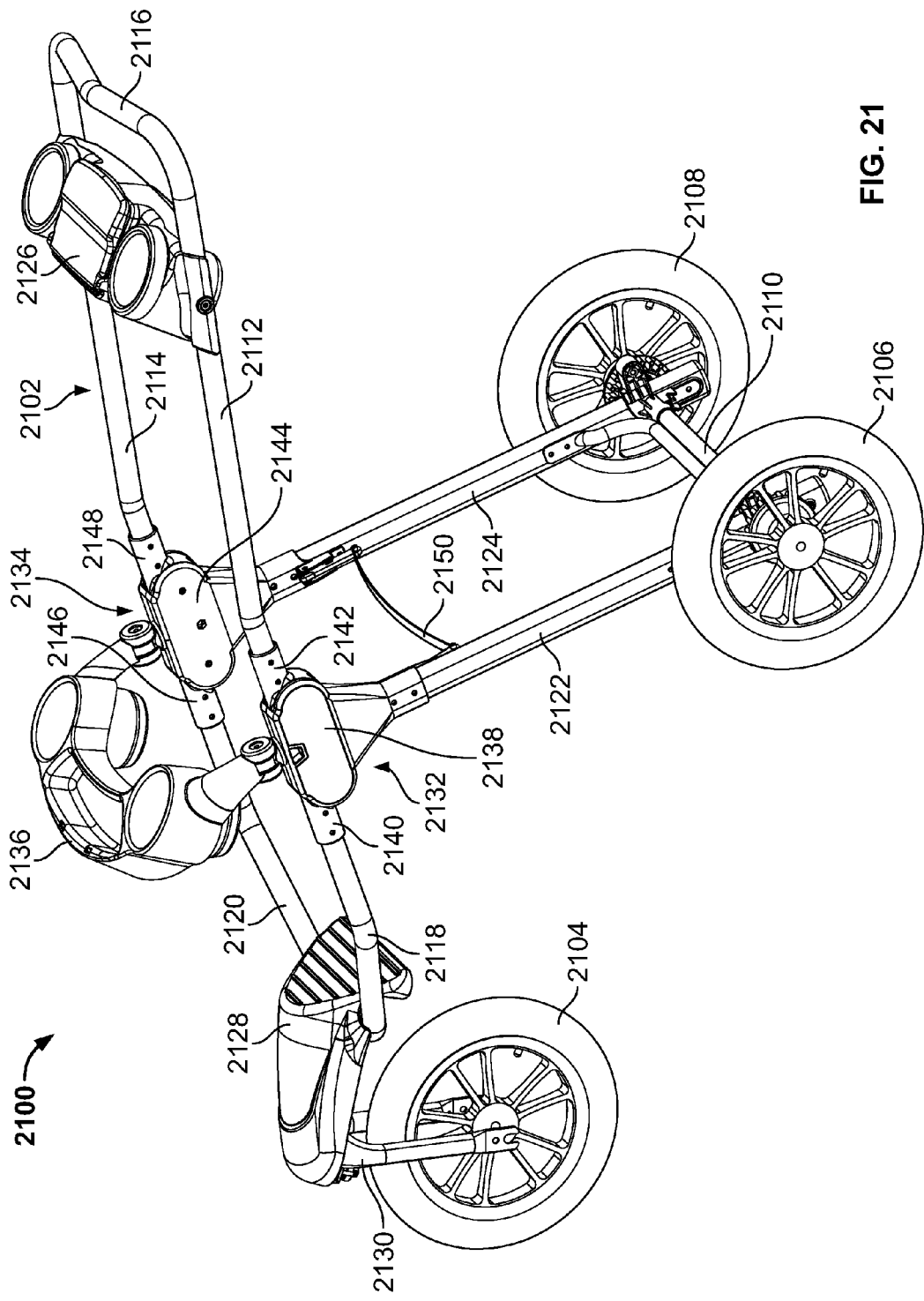
FIG. 21 is a right, rear perspective view of another example stroller disclosed herein.

FIG. 21 is a perspective view of another example stroller 2100 disclosed herein. The illustrated example includes a frame 2102, at least one front wheel 2104, and rear wheels 2106, 2108. The example stroller 2100 also includes a rear axle 2110 coupled to the rear wheels 2106, 2108. In the illustrated example, the frame 2102 includes a left side and a right side. Each side includes a plurality of frame members. In the illustrated example, the frame members of each side include an arm 2112, 2114 extending from a handle 2116, a front leg 2118, 2120, and a rear leg 2122, 2124. In the illustrated example, a first tray 2126 is coupled to the arms 2112, 2114 adjacent the handle 2116. When the example stroller 2100 is in the orientation of FIG. 21 and in an unfolded, operative position, each of the rear legs 2122, 2124 extends upwardly from the rear axle 2110 and toward the front wheel 2104. In the illustrated example, the front legs 2118, 2120 are coupled to a support 2128 (e.g., a footrest). The example support 2128 is coupled to the front wheel 2104 via a bracket 2130. The example front legs 2118, 2120 extend from the support 2128 upwardly in the orientation of FIG. 21 and toward the rear wheels 2106, 2108. In some examples, the front legs 2118, 2120 are substantially aligned with the arms 2122, 2124. For example, in some implementations the central longitudinal axis of a front leg 118 is aligned with the central longitudinal axis of the arm 2122 when the stroller 2100 is unfolded in the operative position. Thus, the front leg 2118 may be aligned with and/or parallel to the arm 2122 and the front leg 2120 may be aligned with and/or parallel to the arm 2124. In some examples, the front legs 2118, 2120 and/or the arms 2122, 2124 are substantially perpendicular to the rear legs 2122, 2124.

In the illustrated example, the left side of the frame 2102 includes a left joint 2132 and the right side of the frame 2102 includes a right joint 2134. The example left joint 2132 is a mirror image of the example right joint 2134. In the illustrated example, a child restraint 2136 is disposed across a width of the frame 2102 and coupled to the right joint 2134 and the left joint 2132. In the illustrated example, the child restraint 2136 includes a second tray for a child occupying the stroller 2100.

In the illustrated example, the left joint 2132 includes a first housing 2138 coupled to the rear leg 2122. A first receptacle 2140 and a second receptacle 2142 are pivotably coupled to the example first housing 2138. In the illustrated example, the front leg 2118 is coupled to the left joint 2132 via the first receptacle 2140, and the arm 2112 is coupled to the left joint 2132 via the second receptacle 2142.

The right joint 2134 includes a second housing 2144 coupled to the rear leg 2124. A third receptacle 2146 and a fourth receptacle 2148 are pivotably coupled to the example second housing 2144. In the illustrated example, the front leg 2120 is coupled to the right joint 2134 via the third receptacle 2146, and the arm 2114 is coupled to the left joint 2132 via the fourth receptacle 2148. A cable or strap 2150 is operatively coupled to the example left joint 2132 and the example right joint 2134. As described in greater detail below, when a user pulls the cable 2150 with sufficient force, the joints 2132, 2134 unlock such that the arms 2112, 2114 and the front legs 2118, 2120 are free to rotate relative to the rear legs 2122, 2124.

FIG. 22 is an enlarged, cutaway view of the example left joint 2132 of FIG. 21. Because the example left joint 2132 is a mirror image of the example right joint 2134, a separate description of the right joint 2134 is not provided here. Instead, the following description of the left joint 2132 can be equally applied to the right joint 2134. In the illustrated example, the left joint 2132 includes a first pivot 2200 and a second pivot 2202 disposed inside the first housing 2138. The example first pivot 2200 is a mirror image of the example second pivot 2202. In the illustrated example, the first pivot 2200 is pivotably coupled to the first housing 2138 about a first axis 2203 of rotation. The example second pivot 2202 is pivotably coupled to the first housing 2138 about a second axis 2204 of rotation. In the illustrated example, the first axis 2203 of rotation is substantially parallel to the second axis 2204 of rotation. In the illustrated example, the first receptacle 2140 is coupled to the first pivot 2200. The example second receptacle 2142 is coupled to the second pivot 2202. Thus, in the illustrated example, the front leg 2118 rotates about the first axis 2203 of rotation via the first pivot 2200 and the arm 2112 rotates about the second axis 2204 of rotation via the second pivot 2202 to fold the example stroller 2100 from the unfolded position to a folded position.

In the illustrated example, the first pivot 2200 includes a first projection 2205 and a second projection 2206. The example second pivot 2202 includes a third projection 2208 and a fourth projection 2210. In the illustrated example, the first housing 2138 includes a stop 2212 (e.g., an obstruction) disposed along a motion path of the projections 2205, 2206, 2208, 2210 of the first pivot 2200 and the second pivot 2202. Thus, if the example first pivot 2200 and the example second pivot 2202 rotate to a first position (e.g., the unfolded position), the first projection 2205 and the third projection 2208 contact the stop 2212. If the example first pivot 2200 and the example second pivot 2202 rotate to a second position (e.g., the folded position), the second projection 2206 and the fourth projection 2210 contact the stop 2212. Thus, the example stop 2212 substantially prevents rotation of the first pivot 2200 and/or the second pivot 2202 past the first position or the second position, thereby defining limits of motion.

In the illustrated example, a plunger 2214 is disposed inside the first housing 2138 and/or the rear leg 2122 and slidably coupled to the first housing 2138 and/or the rear leg 2122. The example plunger 2214 is pivotably coupled to the first pivot 2200 and the second pivot 2202 via a first link 2216 and a second link 2218, respectively. The example first link 2216 and the example second link 2218 are disposed inside the first housing 2138. In the illustrated example, the first link 2216 and the second link 2218 are substantially straight. In other examples, the first link 2216 and the second link 2218 are other shapes. In the illustrated example, the first link 2216 is pivotably coupled to the plunger 2214 and the first pivot 2200 via a third axis 2219 of rotation and a fourth axis 2220 of rotation, respectively. The example second link 2218 is pivotably coupled to the plunger 2214 and the second pivot 2202 via a fifth axis 2221 of rotation and a sixth axis 2222 of rotation, respectively. Thus, the first link 2216, the plunger 2214 and the second link 2218 operatively couple the arm 2112 to the front leg 2118.

In the illustrated example, the plunger 2214 defines an aperture 2223 to receive a locking bar 2224. As described in greater detail below, when the example cable 2150 is unactuated and the example stroller 2100 is in an unfolded, operative position, the locking bar 2224 extends into the aperture 2223 of the plunger 2214 to hold the plunger 2214 in place, thereby locking the left joint 2132 and, thus, the stroller 2100 in the unfolded, operative position.

FIG. 23 is a perspective view of the example first pivot 2200. Because the example first pivot 2200 is a mirror image of the example second pivot 2202, a separate description of the first pivot 2200 is not provided here. Instead, the following description of the first pivot 2200 can be equally applied to the second pivot 2202. In the illustrated example, the first pivot 2200 includes a knuckle 2300. The example knuckle 2300 defines a recess or channel 2302 in which an end of the first link 2216 is to be disposed and coupled to the first pivot 2200. In the illustrated example, the channel 2302 runs along a portion of a surface 2304 of the knuckle 2300 surrounding the first axis 2203 of rotation. When the first pivot 2200 rotates relative to the first housing 2138, the first link 2216 and, thus, the plunger 2214 are driven along the first housing 2138 and/or the rear leg 2122 (e.g., upward or downward in the orientation of FIG. 23, depending on the direction of motion).

Figure 24:
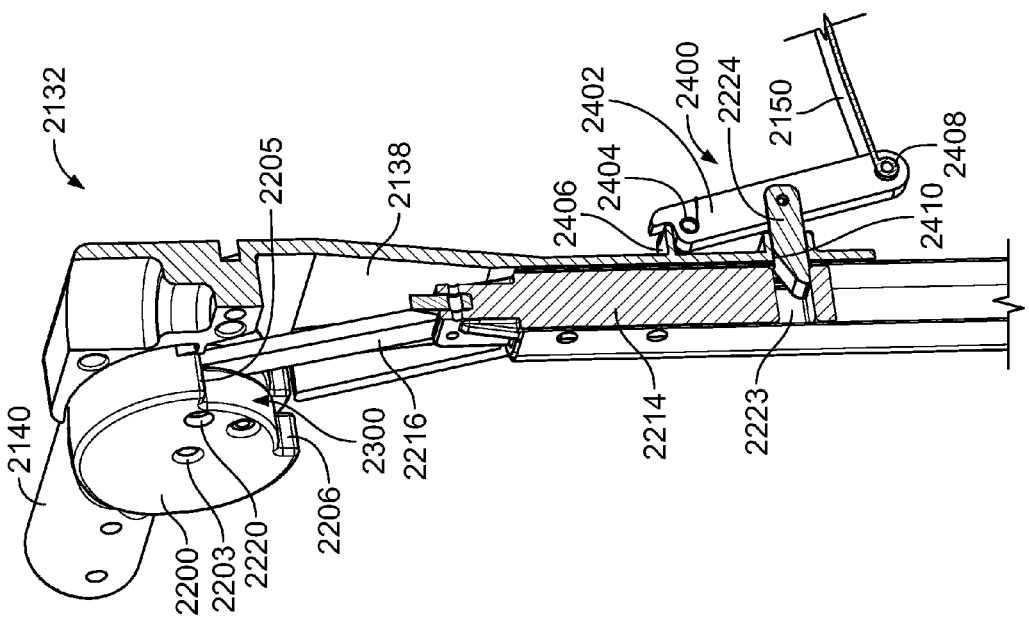
FIG. 24 is a cross-sectional view of the left joint of FIG. 22.

FIG. 24 is a cross-sectional view of the example left joint 2132 of FIG. 22. The example left joint 2132 includes a locking mechanism 2400. In the illustrated example, the locking mechanism 2400 includes a lever 2402 pivotably coupled to the locking bar 2224. In the illustrated example, a first end 2404 of the lever 2402 is pivotably coupled to a bracket 2406 disposed on the first housing 2138. A second end 2408 of the example lever 2402 is coupled to the cable 2150. In the illustrated example, the first housing 2138 and the bracket 2406 define a slot 2410. A portion of the locking bar 2224 is disposed in the slot 2410 and slidably coupled to the bracket 2406 and the first housing 2138. In the illustrated example, the locking bar 2224 extends through the slot 2410 into an interior of the first housing 2138 and the aperture 2223 of the plunger 2214. When the example locking bar 2224 extends into the aperture 2223 of the plunger 2214, the locking bar 2224 locks the example left joint 2132 in place. Thus, the example locking bar 2224 of FIG. 24 is in a locked position.

Figure 25:
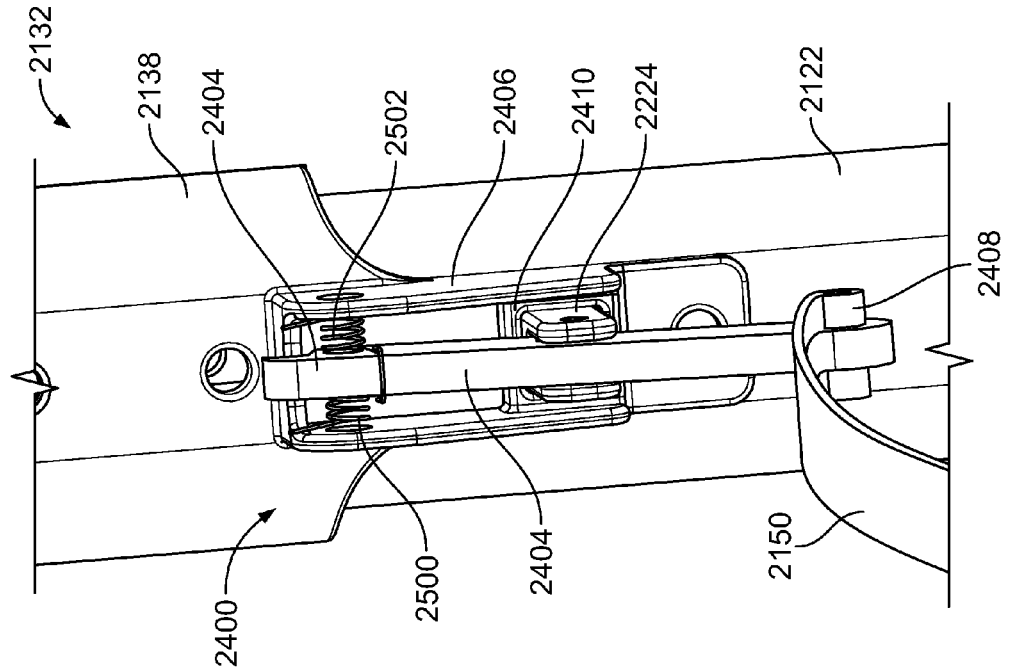
FIG. 25 is an enlarged view of a locking mechanism of the example left joint of FIGS. 21-22 and 24.

FIG. 25 is an enlarged view of the example locking mechanism 2400 of FIG. 24. In the illustrated example, a first spring 2500 and a second spring 2502 (e.g., torsion springs) bias the lever 2402 and, thus, the locking bar 2224 toward the locked position. When the example stroller 2100 is in the unfolded, operative position and the cable 2150 is unactuated, the first spring 2500 and the second spring 2502 substantially maintain the locking bar 2224 in the locked position. If the cable 2150 is pulled with sufficient force, the lever 2402 rotates and withdraws the locking bar 2224 from the aperture 2223 of the plunger 2214, thereby unlocking the example left joint 2132 and enabling the example stroller 2100 to be folded.

Figure 26:
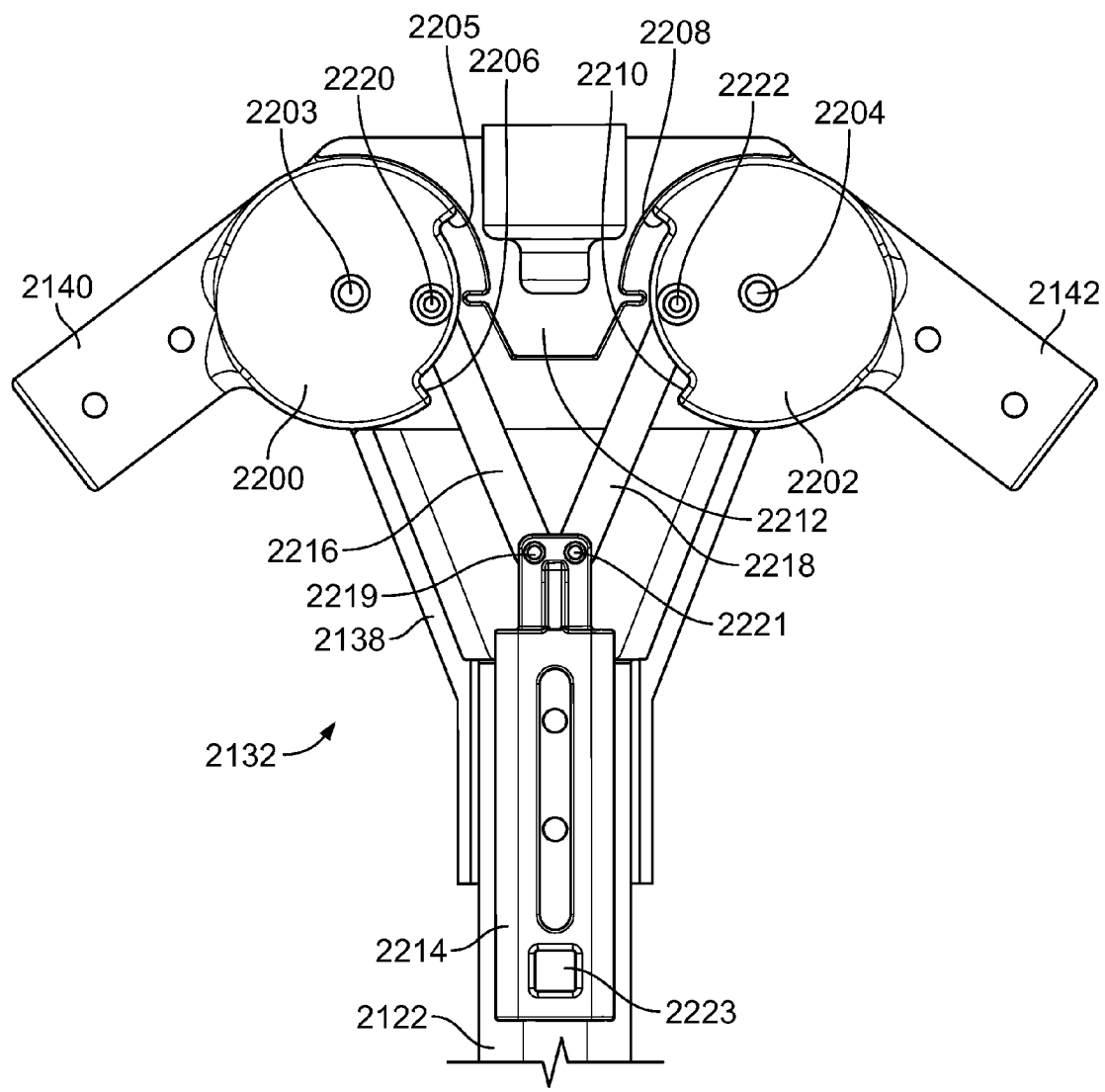
FIG. 26 illustrates the example left joint of FIGS. 21-22 and 24-25 in a semi-folded position.

FIG. 26 illustrates the example left joint 2132 of FIGS. 21-22 and 24-25 in a semi-folded position. When the locking bar 2224 is withdrawn from the aperture 2223 of the plunger 2214, the plunger 2214 may be moved relative to the first housing 2138. As a result, the front leg 2118 and the arm 2112 may rotate toward the rear leg 2122. When the example joint 2132 is in the semi-folded position, the plunger 2214 is positioned below the first pivot 2200 and the second pivot 2202 in the orientation of FIG. 26, and the front leg 2118 and the arm 2112 are rotated toward the rear leg 2122.

In the illustrated example, if the arm 2112 is rotated toward the rear leg 2122, the second pivot 2202 rotates and pulls the plunger 2214 upwards in the orientation of FIG. 26 via the second link 2218. When the plunger 2214 is pulled upwards, the plunger 2214 pushes the first link 2216 upward in the orientation of FIG. 27 and rotates the first pivot 2200 and, thus, the front leg 2118 toward from the rear leg 2122. When the example arm 2112 is rotated away from the rear leg 2122, the second pivot 2202 rotates and pushes the plunger 2214 away from the first pivot 2200 and the second pivot 2202 (e.g., downward in the orientation of FIG. 26) via the second link 2218. When the plunger 2214 is pushed away from the first pivot 2200 and the second pivot 2202 via the second link 2218, the plunger 2214 pulls the first link 2216 to rotate the first pivot 2200 and, thus, the front leg 2218 away from the rear leg 2122. Thus, the example plunger is a follower and enables the arm 2112 and the front leg 2118 to rotate together toward the rear leg 2122.

Figure 27:
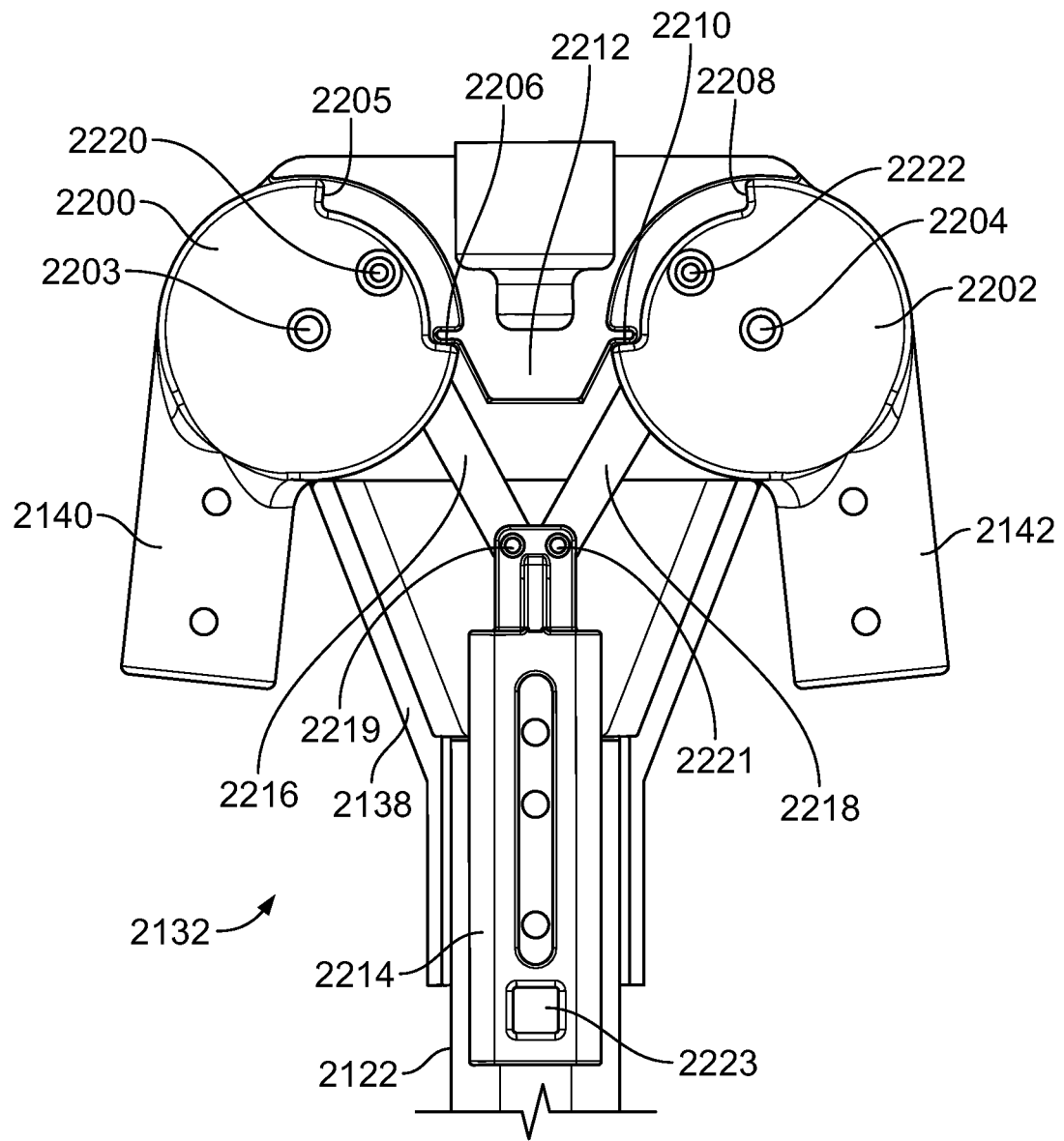
FIG. 27 illustrates the example left joint of FIGS. 21-22 and 24-26 in a folded position.

FIG. 27 illustrates the example left joint 2132 of FIGS. 21-22 and 24-26 in a folded position. A size of the example stroller 2100 in the folded position is less than a size (e.g., form factor) of the stroller 2100 in the unfolded position. Thus, the left joint 2132 and the right joint 2134 enable the example stroller 2100 to fold and, thus, be conveniently stored and/or transported (e.g., in an automobile). To return the example stroller 2100 to the unfolded position, the front leg 2118 and/or the arm 2112 are rotated away from the rear leg 2122 to drive the plunger 2214 downward in the orientation of FIG. 27. When the aperture 2223 of the plunger 2214 is positioned adjacent the locking bar 2224, the locking bar 2224 moves into the aperture 2223 of the plunger 2214 under the influence of the springs 2500, 2502, thereby locking the left joint 2132 in place. The example stroller 2100 may then be used to transport a child occupant.

Figure 28:
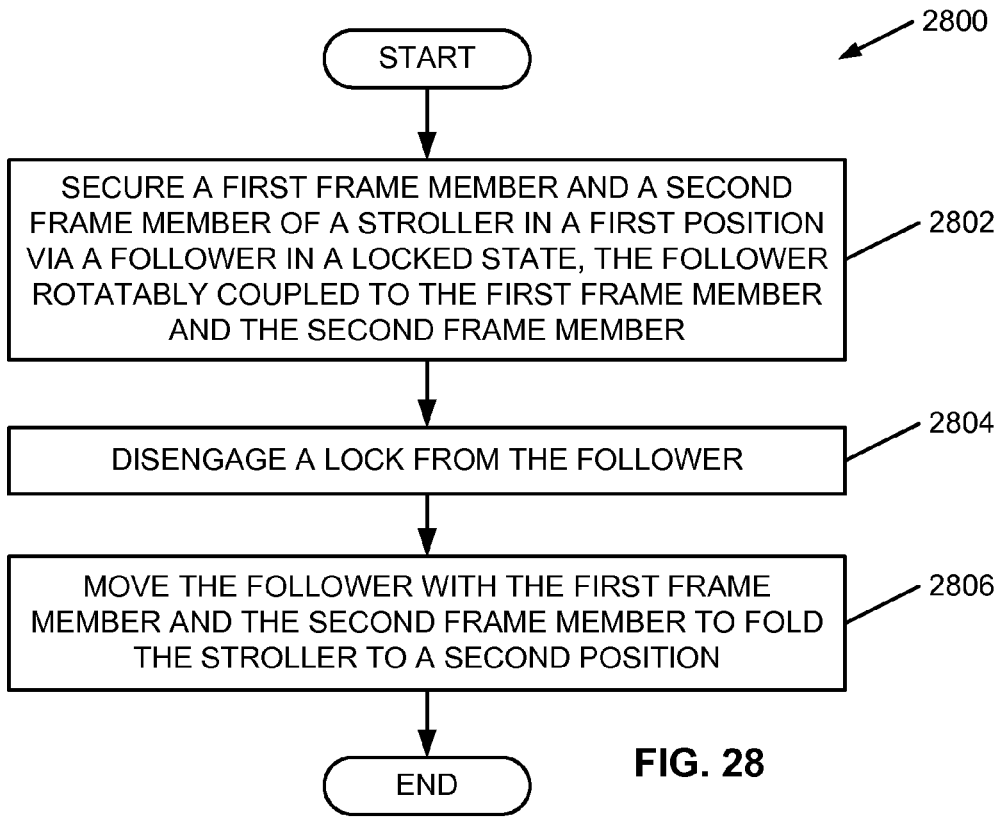
FIG. 28 is a flowchart representative of an example method disclosed herein.
Figure 29:
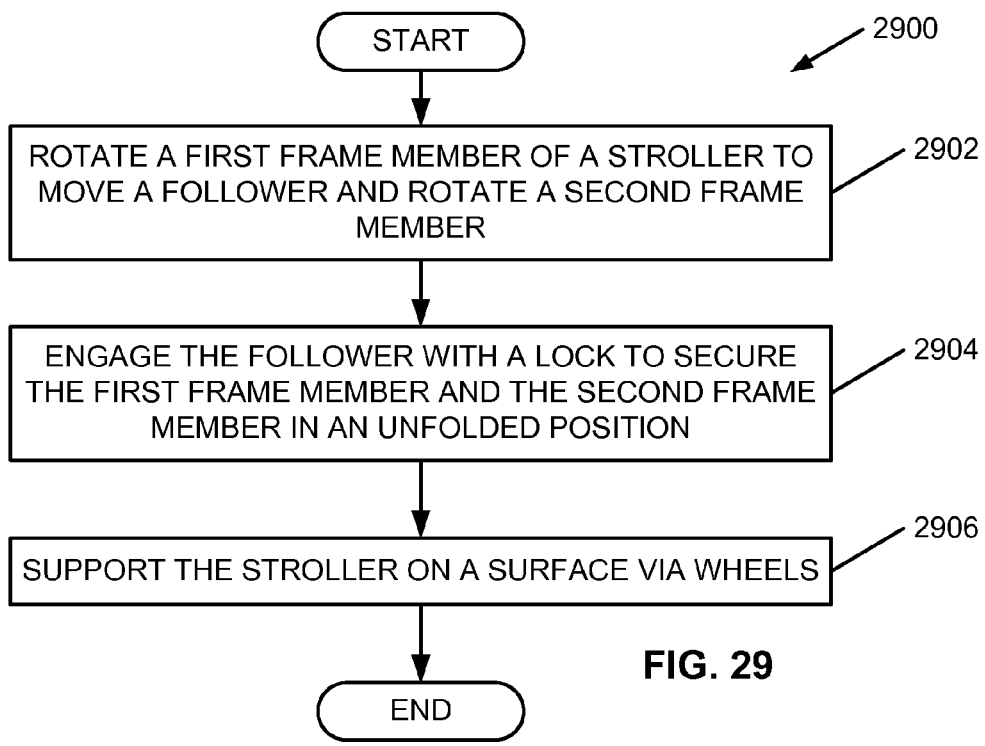
FIG. 29 is a flowchart representative of another example method disclosed herein.
Figure 30:
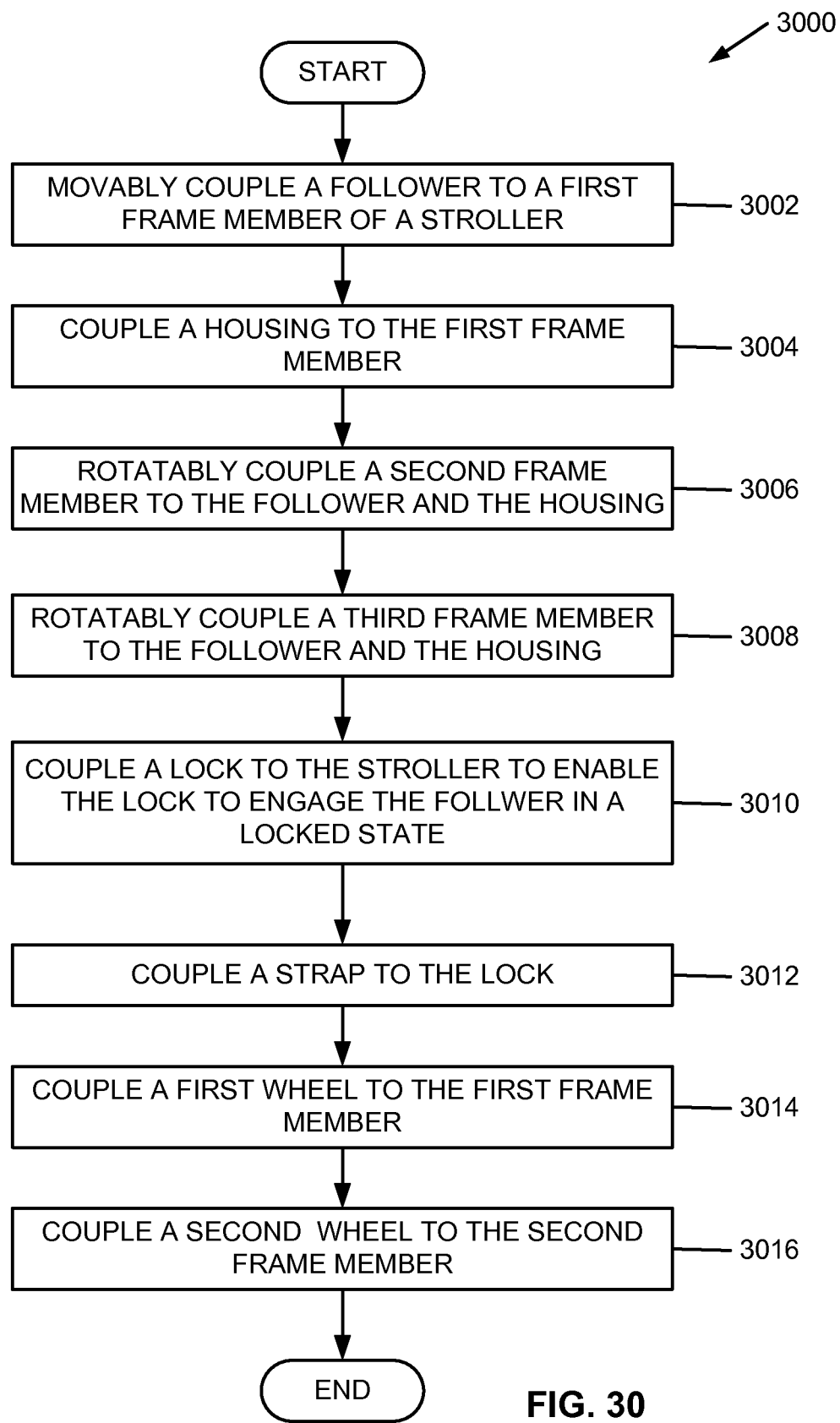
FIG. 30 is a flowchart representative of yet another example method disclosed herein.

Flowcharts representative of example methods are shown in FIGS. 28-30. Although the example methods are described with reference to the flowcharts illustrated in FIGS. 28-30, many other methods may alternatively be used. For example, the order of execution of the blocks may be changed, and/or some of the blocks described may be changed, eliminated, or combined.

The example method 2800 of FIG. 28 may be used to fold a stroller such as, for example, the strollers 600, 1300, 2100 disclosed above. The example method 2800 begins at block 2802 by securing a first frame member and a second frame member of a stroller in a first position via a follower in a locked state. For example, the front leg 2118 and the arm 2112 of the example stroller 2100 of FIG. 21 are secured in the unfolded, operative position via the follower 2214 when the plunger 2214 is held in place (e.g., in a locked state) by the locking bar 2213. In the example method 2800 of FIG. 28, a lock (e.g., the example locking bar 2213) is disengaged from the follower (block 2804). In some examples, the lock is disengaged via one hand operation. For example, a strap or cable (e.g., the strap 632 of FIG. 6, the strap 1332 of FIG. 13, the strap 2150 of FIG. 21, etc.) operatively coupled to the lock may be pulled using one hand to disengage the lock from the follower. The follower is moved with the first frame member and the second frame member to fold the stroller to a second position (block 2806). For example, once the locking bar 2213 is withdrawn from the example plunger 2214 of the example left joint 2132 of FIGS. 21-22 and 24-27, the plunger 2214 is free to move relative to the rear leg 2122. As a result, the example arm 2112 may be rotated toward the rear leg 2122, which pulls the example plunger 2214 toward the first pivot 2200 and the second pivot 2202 via the second link 2218. As the example plunger 2214 is pulled toward the first pivot 2200 and the second pivot 2202, the first link 2216 applies a moment (e.g., torque) to the first pivot 2200 to rotate the first leg 2118 toward the rear leg 2122. Thus, the front leg 2118, the arm 2112 and the plunger 2214 move together to fold the example stroller 2100 of FIG. 21.

In some examples, the first frame member is rotated in a first direction (e.g., clockwise) and the second frame member is rotated in a second direction (e.g., counterclockwise) opposite the first direction to move the follower with the first frame member and the second frame member. In some examples, the first frame member and the second frame member are rotated about different axes of rotation (e.g., the first axis of rotation 2203 and the second axis of rotation 2204, respectively, of FIG. 22). In some examples, the first frame member and the second frame member rotate about the same axis of rotation (e.g., the axis of rotation 832 of FIG. 8). In some examples, a first link (e.g., the first link 720 of FIG. 7, the first link 1418 of FIG. 14, the first link 2216 of FIG. 22, etc.) rotatably coupled to the first frame member and the follower is rotated to move the follower with the first frame member. In some examples, a second link (e.g., the second link 722 of FIG. 7, the second link 1420 of FIG. 14, the second link 2218 of FIG. 22, etc.) rotatably coupled to the follower and the second frame member is rotated to move the second frame member with the follower. In some examples, the follower slides along a third frame member (e.g., the rear leg 2122). In some examples, such as the example left joint 630 of FIG. 6, the follower (e.g., the sleeve 718) slides along an exterior surface of the third leg member. In other examples such as, for example, the left joint 2100 of FIG. 21, the follower (e.g., the plunger 2214) slides inside a third frame member and/or a housing (e.g., the housing 2138).

FIG. 29 is an example method 2900 to unfold a stroller. For example, once the example stroller 2100 is folded using the example method 2800 of FIG. 28, the stroller may be unfolded using the example method 2900 of FIG. 29. The example method 2900 of FIG. 29 begins by rotating a first frame member of a stroller to move a follower and rotate a second frame member (block 2902). For example, the arm 2112 of the example stroller 2100 of FIG. 21 is rotated away from the rear leg 2122 to move the plunger 2214 via the second link 2218 away from the first pivot 2200 and the second pivot 2202. When the example plunger 2214 moves away from the pivots 2200, 2202, the plunger 2214 rotates the front leg 2118 away from the rear leg 2122 via the first link 2216.

The follower is engaged with a lock to secure the first frame member and the second frame member in an unfolded position (block 2904). For example, the locking bar 2213 moves into the aperture 2223 of the plunger 2214 to substantially hold the plunger 2214 and, thus, the example left joint 2132 in place (e.g., in a locked state). In the example method 2900 of FIG. 29, the stroller is supported on a surface (e.g., a floor, a sidewalk, etc.) via wheels (block 2906). For example, the example stroller 2100 of FIG. 21 is positioned and/or oriented such that the wheels 2104, 2106, 2108 support the frame 2102 on a floor, sidewalk and/or any other surface. The example stroller 2100 may then be used to transport a child occupant. In some examples, the method 2900 illustrated in FIG. 29 continues to block 2800 of the example method 2800 of FIG. 28 to fold the example stroller 2100.

FIG. 30 is an example method 3000 of manufacturing a stroller such as, for example, the strollers 600, 1300, 2100 disclosed above. The example method 3000 begins by movably coupling a follower (e.g., the sleeve 718 of FIG. 7, the sleeve 1416 of FIG. 14, the plunger 2214 of FIG. 22, etc.) to a first frame member of a stroller (block 3002). A housing (e.g. the middle housing 702 of FIG. 7, the housing 1400 of FIG. 14, the first housing 2138 of FIG. 21, etc.) is coupled to the first frame member (block 3004). In the illustrated example, a second frame member is rotatably coupled to the follower and the housing (block 3006). In some examples, the second frame member is rotatably coupled to the follower by rotatably coupling a first link (e.g., the first link 720 of FIG. 7, the first link 1418 of FIG. 14, the first link 2216 of FIG. 22, etc.) to the follower and the second frame member. In some examples, the second frame member is rotatably coupled to the housing by coupling the second frame member to a first pivot (e.g., the first pivot portion 706 of FIG. 7, the first pivot 1405 of FIG. 14, the first pivot 2200 of FIG. 22, etc.) rotatably coupled to the housing.

A third frame member is rotatably coupled to the follower and the housing (block 3008). In some examples, the third frame member is rotatably coupled to the follower by rotatably coupling a second link (e.g., the second link 722 of FIG. 7, the second link 1420 of FIG. 14, the second link 2218 of FIG. 22, etc.) to the follower and the third frame member. In some examples, the third frame member is rotatably coupled to the housing by coupling the third frame member to a second pivot (e.g., the second pivot portion 710 of FIG. 7, the second pivot 1406 of FIG. 14, the second pivot 2202 of FIG. 22, etc.) rotatably coupled to the housing. In some examples, the second frame member and the third frame member are coupled to the housing about different axes of rotation (e.g., the first axis of rotation 2203 and the second axis of rotation 2204, respectively, of FIG. 22).

A lock is coupled to the stroller to enable the lock to engage the follower in a locked state (block 3010). For example, the locking mechanism 2400 of FIG. 24 may be coupled to the rear leg 2122 of the example stroller 2100 of FIG. 2100 to enable the locking bar 2213 to engage the plunger 2214 in the locked state. In other examples, other locks and/or locking mechanisms (e.g., the locking mechanism 219 of FIGS. 2-4, the lever 730 of FIGS. 7 and 9-10, the lever 1500 of FIGS. 15-16, etc.) may be used.

A strap is coupled to the lock (block 3012). In some examples, the strap is coupled to the lock on a left side of the stroller and to a lock on a right side of the stroller. For example, the cable 2150 of the example stroller 2100 of FIG. 21 is operatively coupled to the left joint 2132 on the left side of the frame 2102 and to the right joint 2134 on the right side of the frame 2102.

A first wheel (e.g., the example rear wheel 2106) is coupled to the first frame member (block 3014). A second wheel (e.g., the example front wheel 2104) is coupled to the second frame member (block 3016). Thus, a first side (e.g., a left side) of the stroller is formed. In some examples, the first side is combined with (e.g., coupled to) components of a second side (e.g., a right side) of the stroller. In some examples, the second side is manufactured using the example method 3000 of FIG. 30. In some examples, a seat is disposed between the first side and the second side of the stroller to receive a child occupant. In some examples, a child restraint (e.g., the child restraint 2136) is disposed across a width of the stroller. Other components, additionally or alternatively, may also be coupled to the stroller such as, for example, a canopy, a container (e.g., a basket), a tray (e.g., the example tray 2126) and/or other components.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A stroller, comprising:
   a frame;
   a joint carried by the frame, the joint having a first housing, a second housing, and a third housing disposed between the first housing and the second housing, the first housing, the second housing, and the third housing respectively including a first opening, a second opening, and a third opening; and
   a lock including:
      a lever; and
      a bar to simultaneously mate with the first, second, and third openings of the first housing, the second housing, and third housing when the lever is in a first position to prevent rotation of the first housing and the second housing relative to the third housing, the bar to disengage from the first, second, and third openings of the first housing, the second housing, and the third housing when the lever is in a second position to enable the first housing and the second housing to rotate relative to the third housing to fold the stroller.

2. The stroller of claim 1, further including a plunger to operatively couple the lever and the bar.

3. The stroller of claim 2, wherein the lever is operatively coupled to a cable, movement of the cable to cause the lever to move the plunger to move the bar.

4. The stroller of claim 2, wherein the third housing includes a receiving portion and a pivot portion, the receiving portion extending radially from the pivot portion.

5. The stroller of claim 4, wherein the plunger is slidably coupled to the receiving portion.

6. The stroller of claim 5, wherein the opening of the third housing is defined in the pivot portion, the lever to pivot to move the bar toward or away from the opening.

7. The stroller of claim 1, wherein the third housing includes a first surface including a first plurality of connectors and a second surface including a second plurality of connectors;
   the first housing includes a third surface including a third plurality of connectors to mate with the first plurality of connectors; and
   the second housing includes a fourth surface including a fourth plurality of connectors to mate with the second plurality of connectors.

8. The stroller of claim 7, where the first, second, third, and fourth pluralities of connectors respectively include ridges defining spacings therebetween, the ridges of the third plurality of connectors to engage the spacings of the first plurality of connectors to couple the first housing to the third housing and the ridges of the fourth plurality of connectors to engage the spacings of the second plurality of connectors to couple the second housing to the third housing.

9. The stroller of claim 8, wherein first, second, and third housings are substantially circular and the ridges are concentric about a center of the housings.

10. The stroller of claim 8, wherein the ridges define the first and second openings of the first housing and the second housing.

11. The stroller of claim 1, wherein the first housing includes a first receiver to receive a first portion of the frame and the second housing includes a second receiver to receive a second portion of the frame, the first receiver and the second receiver perpendicular to an axis of rotation of the first housing and the second housing.

12. A joint for a stroller including a frame having a first side frame and a second side frame and a cable disposed therebetween, the joint comprising:
   a first housing, a second housing, and a third housing; and
   a lock including:

a lever; and a bar to simultaneously mate with the first, second, and third openings of the first housing, the second housing, and third housing when the lever is in a first position to prevent rotation of the first housing and the second housing relative to the third housing, the bar to disengage from the first, second, and third openings of the first housing, the second housing, and the third housing when the lever is in a second position to enable the first housing and the second housing to rotate relative to the third housing to fold the stroller.

13. The joint of claim 12, further including a plunger to operatively couple the lever and the bar.

14. The joint of claim 13, wherein the lever is operatively coupled to a cable, movement of the cable to cause the lever to move the plunger to move the bar.

15. The joint of claim 13, wherein the third housing includes a receiving portion and a pivot portion, the receiving portion extending radially from the pivot portion.

16. The joint of claim 15, wherein the plunger is slidably coupled to the receiving portion.

17. The joint of claim 16, wherein the opening of the third housing is defined in the pivot portion, the lever to pivot to move the bar toward or away from the opening.

18. The joint of claim 12, wherein the third housing includes a first surface including a first plurality of connectors and a second surface including a second plurality of connectors;
the first housing includes a third surface including a third plurality of connectors to mate with the first plurality of connectors; and
the second housing includes a fourth surface including a fourth plurality of connectors to mate with the second plurality of connectors.

19. The joint of claim 18, where the first, second, third, and fourth pluralities of connectors respectively include ridges defining spacings therebetween, the ridges of the third plurality of connectors to engage the spacings of the first plurality of connectors to couple the first housing to the third housing and the ridges of the fourth plurality of connectors to engage the spacings of the second plurality of connectors to couple the second housing to the third housing.

20. The joint of claim 19, wherein first, second, and third housings are substantially circular and the ridges are concentric about a center of the housings.

21. The joint of claim 19, wherein the ridges define the first and second openings of the first housing and the second housing.

22. The joint of claim 12, wherein the first housing includes a first receiver to receive a first portion of the frame and the second housing includes a second receiver to receive a second portion of the frame, the first receiver and the second receiver perpendicular to an axis of rotation of the first housing and the second housing.

23. A joint for a stroller comprising:
a housing including a first aperture;
a first pivot coupled to the housing, the first pivot including a second aperture;
a second pivot coupled the housing, the second pivot including a third aperture;
a bar movably coupled to the housing, the bar to be simultaneously received in the first aperture, the second aperture, and the third aperture when the first pivot and the second pivot are in a first position such that the first aperture, the second aperture, and the third aperture are substantially aligned; and
a lock to (1) lock the bar in a locked state in the first, second, and third apertures to prevent the first pivot and the second pivot from rotating relative to the housing and (2) selectively release the bar from the first, second, and third apertures to enable the first pivot and the second pivot to rotate relative to the housing.

24. The joint of claim 23, wherein the lock includes a plunger disposed in the housing and a lever to engage the plunger to hold the bar in the first, second, and third housings.

25. The joint of claim 24, wherein the housing includes a receptacle, the plunger disposed in the receptacle.

26. The joint of claim 25, wherein the receptacle includes a fourth aperture, and the lever extends through the fourth aperture to engage the plunger.

27. The joint of claim 23, further including a strap coupled to the lock to enable selective disengagement of the bar from the first aperture, the second aperture, and the third aperture.

* * * * *